(12) United States Patent
Misra et al.

(10) Patent No.: US 11,263,222 B2
(45) Date of Patent: Mar. 1, 2022

(54) SYSTEM FOR CALCULATING COMPETITIVE INTERRELATIONSHIPS IN ITEM-PAIRS

(71) Applicant: Walmart Apollo, LLC, Bentonville, AR (US)

(72) Inventors: Subhasish Misra, Bangalore (IN); Arunita Das, West Bengal (IN); Bodhisattwa Majumder, Kolkata (IN); Amlan Das, Karnataka (IN)

(73) Assignee: Walmart Apollo, LLC, Bentonville, AR (US)

( * ) Notice: Subject to any disclaimer, the term of this patent is extended or adjusted under 35 U.S.C. 154(b) by 587 days.

(21) Appl. No.: 15/834,054

(22) Filed: Dec. 6, 2017

(65) Prior Publication Data
US 2019/0121867 A1 Apr. 25, 2019

(30) Foreign Application Priority Data
Oct. 25, 2017 (IN) .............................. 201741037715

(51) Int. Cl.
| | |
|---|---|
| *G06F 16/2457* | (2019.01) |
| *G06Q 10/06* | (2012.01) |
| *G06F 16/28* | (2019.01) |

(52) U.S. Cl.
CPC ...... *G06F 16/24578* (2019.01); *G06F 16/285* (2019.01); *G06Q 10/067* (2013.01)

(58) Field of Classification Search
CPC ............ G06Q 10/067; G06F 16/24578; G06F 16/285
See application file for complete search history.

(56) References Cited

U.S. PATENT DOCUMENTS

| | | | |
|---|---|---|---|
| 5,974,396 A | | 10/1999 | Anderson et al. |
| 6,035,284 A | * | 3/2000 | Straub .................... G06Q 99/00 705/28 |
| 8,412,656 B1 | | 4/2013 | Baboo et al. |
| 8,874,499 B2 | | 10/2014 | Tiwari et al. |

(Continued)

OTHER PUBLICATIONS

"Inferring Networks of Substitutable and Complementary Products", by Julian McAuley, Rahul Pandey and Jure Leskovec, Aug. 11-14, 2015, Sydney, NSW, Australia. (Year: 2015).*

(Continued)

*Primary Examiner* — Pan G Choy

(57) ABSTRACT

Examples provide a multi-stage cluster component that performs a multi-stage clustering analysis on a plurality of items in a category associated with a selected item using a set of interrelationship factors. The multi-stage cluster component generates a cluster of non-substitute item-pairs, a cluster of traditional substitute item-pairs, and a cluster of variety item-pairs. The set of interrelationship factors includes at least one of measure of association, brand similarity, pack-size similarity, demographic similarity, item description similarity, lift, and/or percentage same-basket variable. A propensity score is generated for each item-pair. The propensity score is utilized to identify traditional substitute items and variety substitute items. Each substitute item is ranked based on the generated propensity score. The ranking is used to identify potential low-performance items for removal from inventory.

20 Claims, 15 Drawing Sheets

(56) References Cited

U.S. PATENT DOCUMENTS

| | | | | |
|---|---|---|---|---|
| 10,489,842 | B2* | 11/2019 | Katukuri | G06Q 30/0631 |
| 10,496,691 | B1* | 12/2019 | Chen | G06F 16/9038 |
| 2001/0049690 | A1* | 12/2001 | McConnell | G06Q 30/02 |
| 2002/0138358 | A1* | 9/2002 | Scheer | G06Q 10/0637 |
| | | | | 705/7.36 |
| 2003/0105682 | A1* | 6/2003 | Dicker | G06Q 30/0633 |
| | | | | 705/26.8 |
| 2006/0242192 | A1 | 10/2006 | Musgrove et al. | |
| 2007/0016557 | A1* | 1/2007 | Moore | G06Q 10/10 |
| 2007/0143235 | A1 | 6/2007 | Kummamuru et al. | |
| 2008/0004989 | A1* | 1/2008 | Yi | G06Q 30/0631 |
| | | | | 705/26.1 |
| 2008/0140684 | A1* | 6/2008 | O'Reilly | G06F 16/353 |
| 2010/0228604 | A1 | 9/2010 | Desai et al. | |
| 2011/0029464 | A1* | 2/2011 | Zhang | G06N 20/00 |
| | | | | 706/12 |
| 2011/0071874 | A1 | 3/2011 | Schneersohn et al. | |
| 2012/0150682 | A1 | 6/2012 | Chowdhary et al. | |
| 2013/0007705 | A1 | 1/2013 | Sullivan et al. | |
| 2013/0070964 | A1* | 3/2013 | Nagamine | G06K 9/72 |
| | | | | 382/103 |
| 2013/0238397 | A1 | 9/2013 | Lei | |
| 2014/0075004 | A1* | 3/2014 | Van Dusen | G06F 30/20 |
| | | | | 709/223 |
| 2015/0142584 | A1* | 5/2015 | Liu | G06Q 30/0269 |
| | | | | 705/14.69 |
| 2015/0356591 | A1 | 12/2015 | Fano et al. | |
| 2016/0042315 | A1* | 2/2016 | Field-Darragh | G06Q 30/0282 |
| | | | | 705/28 |
| 2017/0308809 | A1* | 10/2017 | Mozes | G06F 16/2465 |
| 2018/0315059 | A1* | 11/2018 | Venkatesh | G06Q 10/06375 |

OTHER PUBLICATIONS

"Modeling Relationships at Multiple Scales to Improve Accuracy of Large Recommender System", by Robert M. Bell, Yehuda Koren and Chris Volinsky, AT&T Labs—Research. Research Track Paper, Aug. 12-15, 2007, San Jose, CA, USA. (Year: 2007).*

McAuley, et al. "Inferring networks of substitutable and complementary products," UC San Diego, Stanford University, & Pinterest, 2015, http://cseweb.ucsd.edu/~jmcauley/pdfs/kdd15.pdf, 10 pages.

Bell et al. "Modeling relationships at multiple scales to improve accuracy of large recommender systems," AT&T Labs—Research, 2007, http://citeseerx.ist.psu.edu/viewdoc/download?doi=10.1.1.217.2043&rep=rep1&type=pdf, 10 pages.

Copenheaver, Blaine, "International Search Report", International Application No. PCT/US2018/054895, dated Dec. 17, 2018, 2 pages.

Copenheaver, Blaine, "Written Opinion of the International Searching Authority", International Application No. PCT/US2018/054895, dated Dec. 17, 2018, 8 pages.

* cited by examiner

FIG. 5

RESULT 500

SET OF VARIETY ITEM-PAIRS 502

A-B 506 ITEM PAIR — VARIETY SCORE 508 — ITEM B RANK 514

A-C 510 ITEM PAIR — VARIETY SCORE 512 — ITEM C RANK 516

SET OF TRADITIONAL SUBSTITUTE ITEM-PAIRS 504

A-D 518 ITEM PAIR — TRADITIONAL SCORE 520 — ITEM D RANK 526

A-E 522 ITEM PAIR — TRADITIONAL SCORE 524 — ITEM E RANK 528

*FIG. 7*

| FACTORS 702 | | | |
|---|---|---|---|
| EDUCATION 704 | ADULT QUANTITY 708 | INCOME 712 | ORIGIN-OF-MANUFACTURE 716 |
| ETHNICITY 706 | CHILD QUANTITY 710 | MARITAL STATUS 714 | AGE 718 |

FIG. 12

Pseudocode: 1200

1202
- word_similarity(word1, word2)
  - set length(word1)>length(word2)
  - check
    - first letters are same & last letters are same & all other letters of smaller word belongs to bigger word
  - return 1 if TRUE else 0

1204
- description_similarity(description1, description2)
  - for all words in description1
    - for all words in description2
      - calculate word_similarity
      - description_similarity=word_similarity 1206
- normalize description_similarity
- perform affine transformation
- return description_similarity

SYSTEM FOR CALCULATING COMPETITIVE INTERRELATIONSHIPS IN ITEM-PAIRS

BACKGROUND

Shelf space in retail stores are frequently limited. Therefore, items on the shelf which have lower sales than other items are frequently removed from inventory to increase available shelf-space for items having higher sales. However, removing a low-sales item from the shelves may sometimes have an impact on sales of other interrelated items, such as traditional substitutes and variety substitutes of the removed item.

A traditional substitute is an item that is interchangeable with another item. A traditional, substitute item fills the same need or want as another item. If one item is not available in a store, the customer may purchase a traditional substitute of the unavailable item instead. However, if a low-sales item having no available substitute is removed from inventory, the store may lose a valuable customer base.

A variety substitute is an item that is frequently purchased at the same time as another item. If a low-sales item is a variety substitute for one or more other items, removing that item from inventory may also cause reduced sales of other variety substitute items and reduction in basket-building behavior.

SUMMARY

Some examples provide a system for calculating competitive interrelationships between item-pairs. The system includes a memory and at least one processor communicatively coupled to the memory. A cluster component performs a multi-stage clustering analysis on a plurality of items in a category associated with a selected item. The multi-stage cluster analysis is performed using a set of interrelationship factors to generate a cluster of non-substitute item-pairs, a cluster of traditional substitute item-pairs, and a cluster of variety item-pairs. A scoring component assigns a propensity score to each item-pair in the cluster of traditional substitute item-pairs. The scoring component also assigns a propensity score to each item-pair in the cluster of variety item-pairs. The propensity score indicates a degree of interrelationship between the selected item and a second item in the given item-pair. A ranking component generates a ranking for each traditional substitute of the selected item associated with an item-pair in the cluster of traditional substitute item-pairs. The ranking component generates a ranking for each variety substitute of the selected item associated with an item-pair in the cluster of variety item-pairs. The ranking is generated based on the assigned propensity score.

Other examples provide a computer-implemented method for calculating competitive interrelationships between item-pairs. A first-stage cluster component performs an initial cluster operation on a plurality of item-pairs based on a first set of variables, POS data, and item attribute data to generate a first cluster of non-substitute item-pairs and a first cluster of substitute items. A second-stage cluster component performs a filtration cluster operation on the first cluster of substitute item-pairs using a description similarity variable with the POS data and the item attribute data to generate a second cluster of non-substitute item-pairs and a second cluster of substitute item-pairs. A third-stage cluster component performs a variety cluster operation on the second cluster of substitute item-pairs using a second set of variables, the POS data, and the item attribute data to generate a sub-cluster of traditional substitute item-pairs and a sub-cluster of variety items-pairs within the second cluster of substitute item-pairs. A result is output to at least one user interface component. The result includes an identification of a set of traditional substitute item-pairs associated with the sub-cluster of traditional substitute item-pairs and a set of variety item-pairs associated with the sub-cluster of variety item-pairs.

Yet other examples provide one or more computer storage media, having computer-executable instructions for calculating competitive interrelationships between item-pairs. The computer-executable instructions are executed by a computer to perform a multi-stage clustering analysis on a plurality of items in a selected category using a set of interrelationship factors. The multi-stage clustering analysis generates a cluster of non-substitute item-pairs, a cluster of traditional substitute item-pairs, and a cluster of variety item-pairs. A propensity score is calculated for each item-pair in the cluster of traditional substitute item-pairs and the cluster of variety item-pairs. The propensity score assigned to an item-pair indicates a degree of interrelationship between a first item and a second item in each item-pair. An item-pair classification result is generated. The item-pair classification result includes a classification of each item-pair in the plurality of items and the propensity score assigned to each item-pair. The classification of each item-pair includes at least one of a non-substitute category, a traditional substitute category, and a variety substitute category.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 is an exemplary block diagram illustrating a multi-stage clustering analysis result with item ranks.

FIG. 7 is an exemplary chart illustrating a demographic similarity variable factors.

FIG. 12 is exemplary pseudocode for a filtration cluster operation.

Corresponding reference characters indicate corresponding parts throughout the drawings.

DETAILED DESCRIPTION

Figure 1:
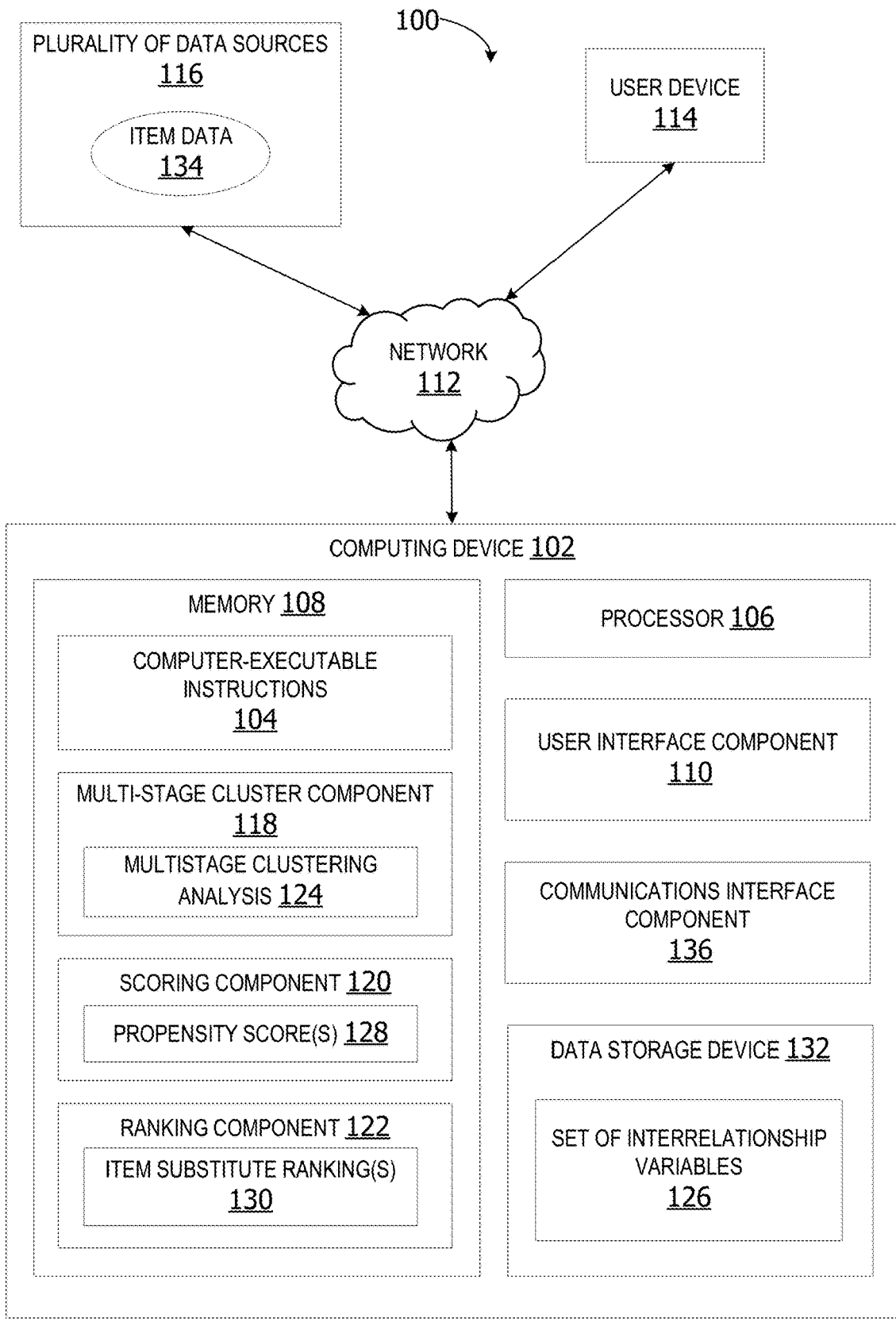
FIG. 1 is an exemplary block diagram illustrating a computing device for calculating competitive interrelationship between two items in an item-pair.

Referring to the figures, some examples of the disclosure enable multi-stage clustering for calculating competitive interrelationships between item-pairs. In some examples, a multi-stage cluster component performs a multi-stage clustering analysis on a plurality of items in a category associated with a selected item using a set of interrelationship factors to generate a cluster of non-substitute item-pairs, a cluster of traditional substitute item-pairs, and a cluster of variety item-pairs.

Traditional substitutes are items which are likely to be bought instead of another item. If a sought-after item is unavailable, a customer may choose a traditional substitute in place of the sought-after item. For example, a three-cheese pizza may be an acceptable substitute for a five-cheese substitute. The multi-stage cluster component more accurately identifies substitute items to prevent deletion of items from inventory which lack an acceptable traditional substitute available on the shelf. This prevents loss of customers due to absence of traditional substitutes for items removed from the shelf due to low sales performance.

A variety substitute is an item that is purchased at the same time as another item. Variety substitutes aid in basket building behavior and bring in more sales into the category. For example, a cheese pizza may be a variety substitute for a pepperoni pizza if customers frequently purchase both cheese pizza and pepperoni pizza at the same time. However, if the cheese pizza is removed from inventory, it may cause reduced sales of variety substitutes, such as the pepperoni pizza. The multi-stage cluster component identifies variety substitute relationships between items more accurately to prevent deletions of items having low-sales that induce basket-building behavior for other items in the same category.

The multi-stage clustering analysis assists with item deletion while considering both availability of traditional substitutes and absence of variety substitutes for an item being considered for removal from stock. An item in these examples is only deleted from inventory if it has poor sales performance, has traditional substitutes available, and is not a variety substitute to a threshold number of other items. Items with poor performance, few/no traditional substitute, but which is a strong variety substitute to one or more items is disqualified as a candidate for removal from inventory due to the competitive interrelationships between the items. This permits increased efficiency and accuracy in identifying items having strong traditional substitutes available in the same category for improved bargaining with suppliers on price-point of the items.

Other examples provide a scoring component that calculates a propensity score for each item-pair in a cluster of substitute item-pairs. The propensity score includes a traditional score for traditional substitute item-pairs and a variety score for variety substitute item-pairs. The propensity score assigned to a given item-pair indicates a degree of interrelationship between the items in the given item-pair. This propensity score enables improved identification of substitute items and variety items for managing inventory items.

A ranking component in other examples generates a score-based ranking for each traditional substitute or variety substitute of a selected item. The ranking enables reduced error rate in identifying item substitutes for improved management of inventory items.

The methodology of the system follows an unsupervised approach, eliminating the need for any tagged data, and hence, manual effort that may be needed to create the tagged data. Moreover, the system is highly scalable.

Referring again to FIG. 1, an exemplary block diagram illustrates a system 100 for calculating competitive interrelationship between two items in an item-pair. In the example of FIG. 1, a computing device 102 represents any device executing computer-executable instructions 104 (e.g., as application programs, operating system functionality, or both) to implement the operations and functionality associated with the computing device 102.

The computing device 102 may include a mobile computing device or any other portable device. In some examples, the mobile computing device includes a mobile telephone, laptop, tablet, computing pad, netbook, gaming device, and/or portable media player. The computing device 102 may also include less portable devices such as desktop personal computers, kiosks, tabletop devices, industrial control devices, wireless charging stations, and electric automobile charging stations. Additionally, the computing device 102 may represent a group of processing units or other computing devices.

In some examples, the computing device 102 has at least one processor 106, a memory 108, and at least one user interface 110. The processor 106 includes any quantity of processing units, and is programmed to execute computer-executable instructions 104. The computer-executable instructions 104 may be performed by the processor 106 or by multiple processors within the computing device 102, or performed by a processor external to the computing device 102. In some examples, the processor 106 is programmed to execute instructions such as those illustrated in the figures (e.g., FIG. 9, FIG. 10, FIG. 11, and FIG. 12).

In some examples, the processor 106 represents an implementation of analog techniques to perform the operations described herein. For example, the operations may be performed by an analog computing device and/or a digital computing device.

The computing device 102 further has one or more computer readable media such as the memory 108. The memory 108 includes any quantity of media associated with or accessible by the computing device 102. The memory 108 may be internal to the computing device 102 (as shown in FIG. 1), external to the computing device (not shown), or both (not shown). In some examples, the memory 108 includes read-only memory and/or memory wired into an analog computing device.

The memory 108 stores data, such as one or more applications. The applications, when executed by the processor 106, operate to perform functionality on the computing device 102. The applications may communicate with counterpart applications or services such as web services accessible via a network 112. For example, the applications may represent downloaded client-side applications that correspond to server-side services executing in a cloud.

In some examples, the user interface component 110 includes a graphics card for displaying data to a user and receiving data from the user. The user interface component 110 may also include computer-executable instructions (e.g., a driver) for operating the graphics card. Further, the user interface component 110 may include a display (e.g., a touch screen display or natural user interface) and/or computer-executable instructions (e.g., a driver) for operating the display. The user interface component 110 may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device 102 in a way.

The network 112 is implemented by one or more physical network components, such as, but without limitation, routers, switches, network interface cards (NICs), and other network devices. The network 112 may be any type of network for enabling communications with remote computing devices, such as, the user device 114 or the plurality of data sources 116. The plurality of data sources 116 may include one or more POS devices, one or more data storage devices, databases, cloud storage, or any other source of item data 134.

The network 112 may include, but is not limited to, a local area network (LAN), a subnet, a wide area network (WAN), a wireless (Wi-Fi) network, or any other type of network. In this example, the network 112 is a WAN, such as the Internet. However, in other examples, the network 112 may be a local or private LAN.

The memory 108, in this non-limiting example, stores one or more components, such as a multi-stage cluster component 118, a scoring component 120, and/or a ranking component 122. The multi-stage cluster component 118, when executed by the processor 106 of the computing device 102, causes the processor 106 to perform a multi-stage clustering analysis 124 on a plurality of items in a category associated with a selected item using a set of interrelationship variables 126 to generate a cluster of non-substitute item-pairs, a cluster of traditional substitute item-pairs, and a cluster of variety item-pairs.

In some examples, an item is defined as a product $p$ from a product universe $\mathbb{P}$, which belongs to a category c from a category universe $\mathbb{C}$. The multi-stage cluster component 118 quantifies the interrelationship of an item-pair ($p_i$, $p_j)_{i \neq j} \in \mathbb{P} \times \mathbb{P}$ when both $p_i$ and $p_j$ come from the same category, c. It is understood that a product pair may or may not share a competitive relationship among them. Thus, we define three mutually exclusive and exhaustive sets of product pairs which are defined based on various kind of competitive relationship of an item-pair.

An item-pair ($p_i$, $p_j$) (dropping the notation i≠j for simplicity) as a set of different factors which in turn will describe their interrelationship. The item-pair may be defined as follows:

($p_i$, $p_j$)={Attribute,Demographic,Consumption, Price}

Attribute signifies a relatedness in the intrinsic information of the items. For example, an item attribute may identify brands of the items, sizes of the items, per-unit price of the items, item count, item description, etc.

Demographic signifies the comparison of consumer populations who usually consume the product. Differences in population's demographic affects the purchase behavior of consumers.

Consumption denotes the consumption pattern of the products in a pair, in an aggregate level. Competitive relationship is defined in some examples is defined by the way two items are associated based on their consumption pattern.

Price is a variable that varies from item to item. Given a pair, the price variable captures the dissimilarity in prices for both items in an item-pair, which indicates relatedness of the two items.

The system 100 in some examples analyzes a plurality of item-pairs using a multi-stage clustering approach. The multi-stage clustering approach includes an initial cluster analysis which identifies two broad clusters, a substitute item-pairs cluster and a non-substitute item-pairs cluster. During a second stage of the multi-stage cluster analysis, the system 100 uses a filtration stage to fine-tune the substitute item-pair cluster. In the third stage of the multi-stage cluster analysis, the multi-stage cluster component runs another iteration of clustering to form a sub-cluster of traditional item-pairs and another sub-cluster of variety substitute item-pairs within the fine-tuned substitute item-pair cluster.

The scoring component 120, when executed by the processor 106 of the computing device 102, causes the processor 106 in some examples to calculate one or more propensity score(s) 128 for one or more item-pairs in the sub-cluster of traditional substitute item-pairs. The scoring component 120, in other examples, calculates the one or more propensity score(s) 128 for one or more item-pairs in the sub-cluster of variety item-pairs.

A propensity score in the one or more propensity score(s) 128 assigned to an item-pair indicates a degree of interrelationship between the items in the item-pair. The system 100 in some examples creates an exhaustive profile of an item-pair to understand the interrelation between the two items in the item-pair. The interrelationship between items in an item-pair may be evaluated in terms of transaction patterns by users of the item, the attributes of the items, demographics of those using/purchasing the items, etc. The propensity score is generated based on the evaluated interrelationship between the items.

In some examples, the propensity score for an item-pair indicates a propensity for a first item in an item-pair to be a traditional substitute or a variety substitute for a second item in the item-pair. If the first item in an item-pair is a Brand A diet soft drink and the second item is a Brand B diet soft drink, the propensity score, in one example, indicates the degree or propensity in with which the second item may act as a substitute for the first item. A higher propensity score above a threshold value indicates the Brand A soft drink item is frequently used interchangeably with the Brand B soft drink item. If the propensity score is lower (below the threshold value), it indicates the Brand B soft drink item is rarely used as a substitute for the Brand A soft drink item.

Thus, in some examples, the multi-stage cluster component generates three separate clusters. The clusters include a non-substitute item-pairs cluster, a traditional substitutes item-pairs cluster, and a variety substitutes item-pairs cluster. In these examples, the scoring component creates one propensity score for each item-pair falling into the traditional substitutes item-pairs cluster and/or item-pairs falling into the variety substitutes item-pairs cluster. The propensity scores show the extent of traditional/variety substitution A ranking component 122, when executed by the processor 106 of the computing device 102, causes the processor 106 in some examples to generate a ranking for each traditional substitute of the selected item associated with an item-pair in the cluster of traditional substitute item-pairs. A traditional substitute is an item in at least one item-pair in the cluster of traditional substitute item-pairs.

The ranking component 122 in other examples generates one or more item substitute ranking(s) 130 for at least one substitute item associated with the selected item. A substitute item may include a variety substitute of the selected item or a traditional substitute of the selected item. In some examples, the ranking component generates a ranking for each traditional substitute of the selected item in the cluster of traditional substitute item-pairs. The ranking is generated based on the calculated propensity score for each item-pair in the cluster of traditional substitute item-pairs.

In other examples, the ranking component 122 generates a ranking for each variety substitute of the selected item in the cluster of variety item-pairs. A variety substitute is an item in at least one item-pair in the cluster of variety substitute item-pairs. The ranking is generated based on the calculated propensity score for each item-pair in the cluster of variety item-pair substitutes.

In one example, the ranking component 122 generates a ranking for all available traditional substitutes of a selected item and all available variety substitutes of the selected item. If the selected item A is associated with the following five traditional substitute item-pairs: (A, B), (A, C), (A, D), (A, E), and (A, F), the ranking component 122 generates a ranking for each of the five traditional substitutes (B, C, D, E, and F) based on the propensity score calculated for each of the traditional substitute item-pairs. If the item-pair (A, E) is assigned the highest propensity score, this indicates that the traditional substitute "E" is the best traditional substitute for "A." Therefore, the ranking component 122 assigns the highest rank. In this example, the highest rank is a first ranking (rank 1).

The system 100 may optionally include a data storage device 132. The data storage device 132 may include a set of one or more data storage devices storing data, such as set of interrelationship variables 126, item data 134 associated with the plurality of items, the propensity score(s) 128, the item substitute ranking(s) 130, and/or any other data. The data storage device may include one or more types of data storage devices, such as, for example, one or more rotating disks drives, one or more solid-state drives (SSDs), and/or any other type of data storage device. The data storage device in some non-limiting examples includes a redundant array of independent disks (RAID) array. In other examples, the data storage device includes a database.

The item data 134 includes any data describing or associated with at least one item in the plurality of items in the category. The item data 134 may include point-of-sale (POS) data generated by one or more POS devices in the plurality of data sources 116. In other examples, the item data 134 may include demographic data of users, item attribute data, sales trends, item descriptions, per-unit price, item weight, per-unit item count, or any other type of data associated with an item.

In this example, the multi-stage cluster component 118, the scoring component 120, and the ranking component 122 are stored on the memory 108. However, in other examples, one or more of the components may be stored remotely on a cloud server or remote computing device. In these examples, the computing device 102 accesses the multi-stage cluster component 118, the scoring component 120, and the ranking component 122 via the network 112. A selected item may have multiple traditional substitutes and/or multiple variety substitutes. The propensity score(s) for each traditional and/or variety substitute assists the ranking component in generating a rank order for all the available traditional and variety substitutes. Assortment decisions may then be made in accordance with the ranks.

In some examples, the computing device 102 includes a communications interface component 136. The communications interface component 136 may include a network interface card and/or computer-executable instructions (e.g., a driver) for operating the network interface card. Communication between the computing device 102 and other devices, such as the user device 114, may occur using any protocol or mechanism over any wired or wireless connection. In some examples, the communications interface component 136 is operable with short range communication technologies such as by using near-field communication (NFC) tags.

Figure 2:
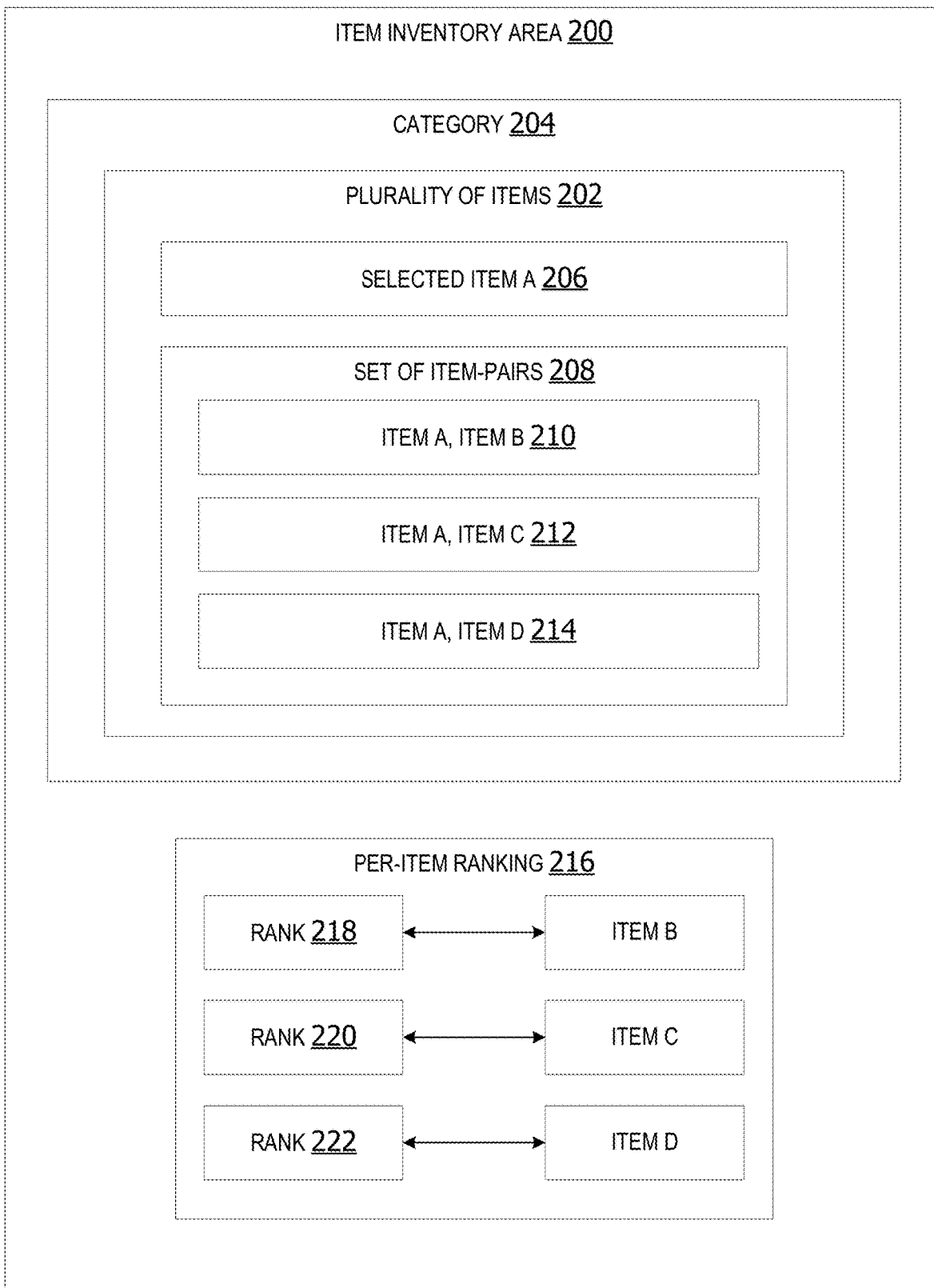
FIG. 2 is an exemplary block diagram illustrating item-pairs associated with a category of items.

FIG. 2 is an exemplary block diagram illustrating item-pairs associated with a category of items. An item inventory 200 is a system inventory including a plurality of items 202 in one or more categories, such as category 204.

An item is selected from the plurality of items 202 in each category of the item inventory 200 for multi-stage cluster analysis by a cluster component, such as the multi-stage cluster component 118 in FIG. 1. A category, such as category 204 is a grouping of one or more items sharing some attribute in common. The system takes a category number as the primary input in some examples. Given the category number or category identifier, the system creates features from one or more data sources. In some examples, the data sources include POS data, item attribute data, and/or demographic data.

For example, category A 204 may be identified via a category number or identifier associated with a condiments category. The category 204 in this example may include items such as ketchup and mustard. Other categories may include, without limitation, a bread category, a milk category, a spice/seasonings category, a soft drink category, a frozen vegetables category, or any other category for grouping items.

A category 204 may have any number of items in the category. A category may include only a few items, as well as more than one-thousand items. A selected item 206 in some examples is an item from a selected category that is under-performing or associated with transactions below a threshold level. The selected item 206 is an item identified as a potential item for removal from inventory. The multi-stage cluster analysis is performed on the selected item 206 in some examples to determine whether the selected item 206 is a good candidate for removal from inventory or the selected item should not yet be removed from item inventory due to competitive interrelationships between the selected item and one or more other items in inventory, such as another item in the same category 204.

If an item has poor performance and many traditional substitutes and variety substitutes, the item may be removed from shelf w/o losing customers. If an item is a variety item that encourages purchase of other items (basket building behavior) and ensures more items are added to a basket, the item should not be removed from shelf or inventory.

The plurality of items 202 may include a set of one or more item-pairs 208 associated with the selected item 206. Each item-pair in the set of item-pairs includes the selected item and one other item from the selected category 204. For example, the set of item-pairs 208 in this example includes the selected item A and an item B in a first item-pair 210, the selected item A and an item C in a second item-pair 212, the selected item A and an item D in a third item-pair 214. The set of item-pairs are analyzed by the cluster component via the multi-stage cluster analysis to identify any substitute items for item A and/or identify any variety substitutes for item A.

In other examples, the item inventory 200 may include a per-item ranking generated by a ranking component based on the propensity score for each item-pair in the set of item-pairs 208, such as the ranking component 122 in FIG. 1. The ranking indicates whether a given item is a substitute for the selected item and/or indicates a degree of the interchangeability/substitution between the selected item and the ranked item.

In this non-limiting example, the per-item ranking 216 is a set of traditional rankings for the set of item-pairs 208. The per-item ranking may include an item B rank 218, an item C rank 220, and an item D rank 222. For example, if item B is a similarity priced brand X ketchup having a rank of 9, item C is a more expensive organic ketchup having a rank of 5, and item D is mustard having a rank of only 3, the ranks indicate that item B is the strongest traditional substitute item for item A where a higher ranking indicates a stronger traditional substitute. The rankings in this example also indicate that item D is the weakest substitute for item A.

In this example, the item rankings included traditional item rankings. In other examples, the ranking may be a variety ranking. For example, if the selected item A is a brand Y regular ketchup, and item B is another similar ketchup brand, item C is a sugar-free ketchup brand, and item D is an organic ketchup, the ranking may indicate that item C has the highest variety ranking, item D has the second highest variety ranking, and item B has the lowest variety ranking.

Figure 3:
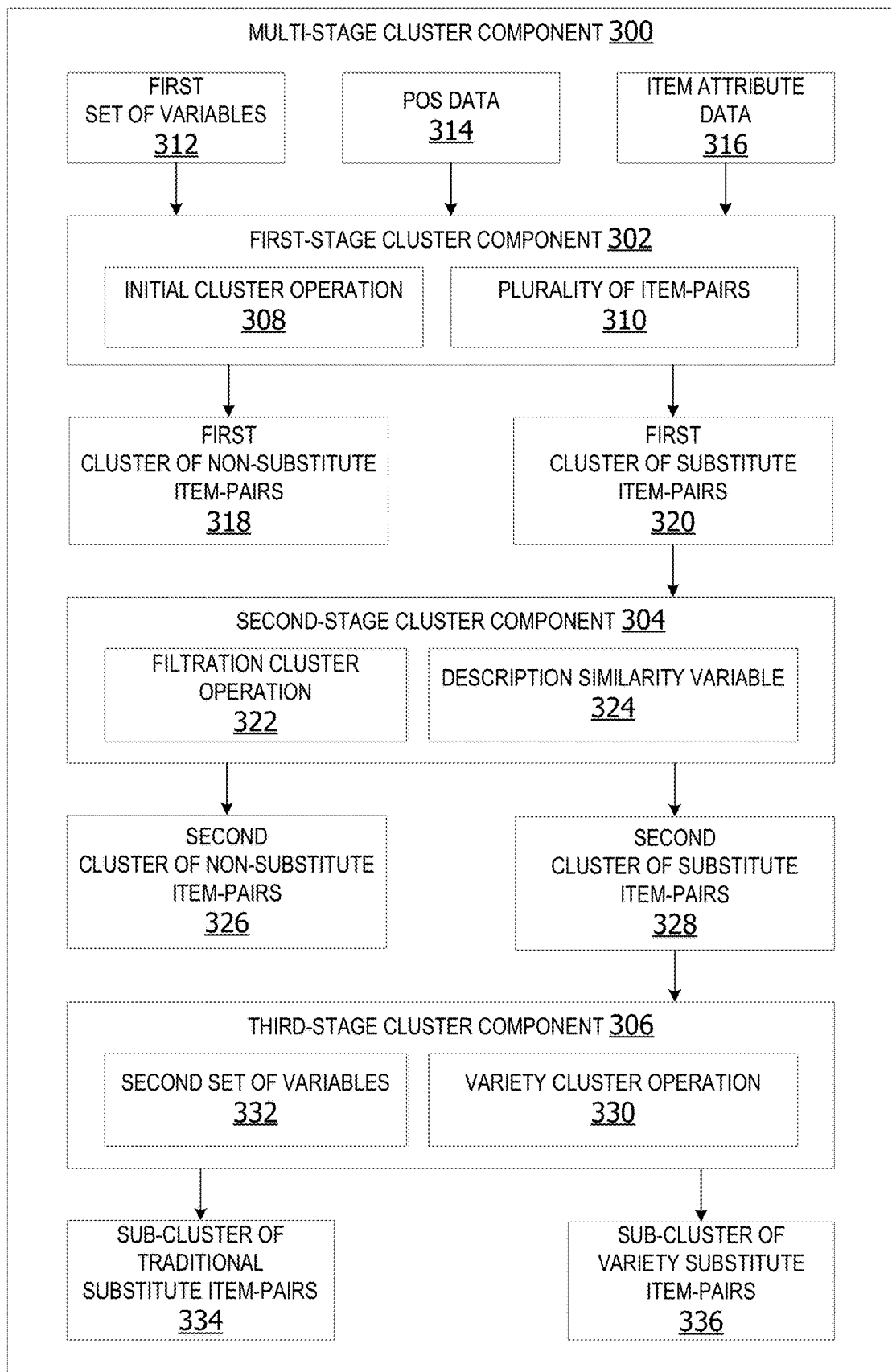
FIG. 3 is an exemplary block diagram illustrating a multi-stage cluster component.

FIG. 3 is an exemplary block diagram illustrating a multi-stage cluster component 300. The multi-stage cluster component 300 in some examples includes a first-stage cluster component 302, a second-stage cluster component 304, and a third-stage cluster component 306.

The first-stage cluster component 302 in some examples performs an initial cluster operation 308 on a plurality of item-pairs 310 based on a first set of variables 312, POS data 314, and item attribute data 316. The first-stage cluster component 302 generates a first cluster of non-substitute item-pairs 318 and a first cluster of substitute item-pairs 320.

In some examples, the first set of variables 312 includes a measure of association variable, a brand similarity variable, a pack-size similarity variable, and/or a demographic similarity variable. The first-stage cluster component 302 utilizes one or more of the variables in the first set of variables 312 to identify the first cluster of non-substitute item-pairs 318 and the first cluster of substitute item-pairs 320.

The first-stage cluster component 302 generates two clusters of item-pairs during the first stage. However, the multi-stage cluster component does not know which cluster is the substitute item-pair cluster and which cluster is the non-substitute item-pair cluster. Therefore, the multi-stage cluster component calculates values for the variables in the first set of variables 312. The first set of variables have higher values for item-pairs in a substitute item-pair cluster as compared to item-pairs in the non-substitute cluster. The system produces these two clusters using the k-means clustering algorithm (k=2), in some examples. The cluster with the higher mean value associated with the variables in the first set of variables 312 is identified as the substitute item-pair cluster. The cluster with the lower mean value is identified as the non-substitute item-pair cluster.

The initial cluster operation 308 in other examples passes values for the first set of variables to a k-means (k=2) clustering algorithm to form the non-substitute item-pair cluster and the substitute item-pair cluster. The non-substitute items cluster together and get separated from the substitute cluster.

The k-means from the initial cluster operation, in one example, provides two clusters, cluster 1 and cluster 2, in which cluster 1 has 7000 item-pairs and cluster 2 has 4000 item-pairs. The multi-stage cluster component utilizes the first set of variables to form the clusters. The numeric values for the first set of variables are higher numeric values for a substitute pair as compared to a not-substitute pair. For example, substitute pairs are likely to have higher association than the non-substitute item-pairs. In other words, the cluster in which majority of the substitute item-pairs have come together should have higher aggregated value for the variables in the first set of variables. Thus, $$\{\text{Average (Measure of association)} + \text{Average (Brand Similarity)} + \text{Average (Pack size Similarity)} + \text{Average (Demographic Similarity)}\}.$$

The cluster having a higher value for the above expression is the one which contains a majority of substitute item-pairs. The sum of the average value for each variable in the first set of variables are higher for that cluster.

The multi-stage cluster component calculates the above expression for both the two clusters. The cluster that has the highest value is identified as the substitute item-pair cluster. The number of item-pairs in the two clusters may be different. The multi-stage cluster component takes the average and the sum of the average values of the variables. This is the crux of the profiling exercise. Similar profiling exercises are followed the clustering in the filtration stage and the variety cluster operation.

In this example, the cluster 318 is identified as the non-substitute item-pairs group, which is discarded. The cluster 320 in this example is identified as the cluster of substitute item-pairs, which is further analyzes using a second-stage, filtrations cluster operation 322.

The second-stage cluster component 304 performs the filtration cluster operation 322 on the first cluster of substitute item-pairs 320 using a description similarity variable 324. The item description similarity variable 324 is utilized to calculate a value indicating similarity between the words/description associated with each item in an item-pair.

In some examples, an item description is retrieved for every item in each category. The item description includes a text description which primarily consists of different attributes of the item, other than brand and pack-size. The item description variable 324 includes the functional form of the item, the flavor etc. A user willing to substitute one item for another is likely to look for the same set of attributes in the substitute item. The system generates the text description similarity value, in some examples, using a text mining approach which calculates how similar an item-pair is in terms of the item description for both items.

The item description similarity value, in some examples, is a score between 0 and 1. As the item description similarity value approaches a value of "1", the chances that the item-pair is a substitute item-pair rather than a non-substitute item-pair increases.

The item description similarity variable 324 in some examples is a mapping $\omega_{ij}: \mathfrak{D} \times \mathfrak{D} \rightarrow \mathbb{R}\,[0,1]$. An item description consists of explicit or implicit mentions of various attributes like flavor, gender and other functional forms, except brand. Items having very similar descriptions have greater potential to be utilized as substitutes. Traditional substitutes are likely to be more similar in terms of item description, as compared to variety substitutes pairs.

In other examples, a word-similarity metric→ℝ [0,1] considering the first and last letter match is created. All other common letters are considered to be present in the smaller word. A normalized description similarity is generated via taking a sum over all word similarities and preform an affine transformation to determine its range correctly.

The filtration cluster operation 322 generates a second cluster of non-substitute item-pairs 326 and a second cluster of substitute item-pairs 328. In other examples, the second-stage cluster component 304 utilizes the POS data 314 and the item attribute data 316 during the filtration cluster operation 322 to further refine the set of substitute item-pairs for the selected item. The cluster which has a higher average for item description similarity value is the fine-tuned substitute item-pair cluster.

In other examples, the preponderance of non-substitutes in any category necessitates further fine-tuning of the substitute item-pair cluster because non-substitute item-pairs sometimes seep into the substitute item-pair cluster. The filtration cluster operation fine-tunes the substitute cluster by further forming two additional clusters, one with the impurities (non-substitute item-pairs) and a second, finer set of substitute item-pairs.

The second-stage cluster component uses the item description similarity, in some examples, as the feature in the K-means(k=2) clustering algorithm in the second-stage clustering. This feature proxies for the different attributes present in the items. Substitute items are more similar in terms of the attributes, as compared to non-substitutes. Substitute item description similarity has higher values. After formation of the two clusters of item-pairs, profiling is performed in terms of item description similarity to detect the cluster with the finer set of substitute item-pairs, which is identified as the second cluster of substitute item-pairs 328. In some examples, the second cluster of substitute item-pairs 328 is merged with the first cluster of substitute item-pairs 320.

The cluster identified as the second set of non-substitute item-pairs 326 is not analyzes during the third-stage of the multi-stage cluster analysis. The second set of non-substitute item-pairs 328 is discarded in some examples. In other examples, the second set of non-substitute item-pairs 328 is merged with the first set of non-substitute item pairs 318.

The third-stage cluster component 306 performs a variety cluster operation 330 on the second cluster of substitute item-pairs 328 using a second set of variables 332. The variety cluster operation 330 generates a sub-cluster of traditional substitute item-pairs 334 and a sub-cluster of variety substitute items-pairs 336 within the second cluster of substitute item-pairs 328.

In other examples, the third-stage cluster component 306 utilizes the POS data 314 and the item attribute data 316 during the variety cluster operation 330 to further refine the set of substitute item-pairs for the selected item. The multi-stage cluster component 300 outputs a set of traditional substitute item-pairs associated with the sub-cluster of traditional substitute item-pairs and a set of variety item-pairs associated with the sub-cluster of variety item-pairs to a user interface component, an output device, and/or to a remote computing device via a network.

In some examples, during the third-stage, variety cluster operation, the system takes the finer set of substitute item-pairs generated during the second-stage cluster operation. The multi-stage cluster component forms two sub-clusters among them, a traditional item-pairs sub-cluster and a variety item-pairs sub-cluster. In this third-stage clustering operation, the system passes a second set of variables as input to a k-medoids clustering algorithm to form different clusters for traditional and variety substitute item-pairs.

The second set of variables passed to the k-medoids (k=2) clustering algorithm may include a lift variable, a percentage same-basket variable, an item description similarity variable and a demographic similarity variable.

Given an item-pair ($p_i$, $p_j$), lift is the ratio of the probability of both items in the item-pair being bought together in the same basket to the probability of these two items being bought individually. The following equations:

$$\mathcal{L}_{ij} = \frac{P(p_i \cap p_j)}{P(p_i) \times P(p_j)} \mathcal{L}_{ij} = 1 \Leftrightarrow P(p_i \cap p_j) = P(p_i) \times P(p_j)$$

indicate the purchase of $p_i$ and $p_j$ are independent events. While the equation $$\mathcal{L}_{ij} > 1 \Leftrightarrow P(p_i \cap p_j) > P(p_i) \times P(p_j)$$

indicates the first item and second item ($p_i$ and $p_j$) are likely to be bought together in the same basket rather than being bought separately. As the value for the lift variable increases, variety behavior increases.

Thus, variety seeking behavior results in higher lift for such item-pairs. For traditional substitute items, the purchase of one item in an item-pair nullifies the purchase probability of the other item in the item-pair because both items in the item-pair serve the same need/function. Therefore, the lift value for a traditional pair is likely to be lower because traditional substitute items are not bought in the same transaction.

Other metrics for market basket analysis, such as confidence and support, are omitted in this example due to confidence's asymmetric nature and support's tendency to be deflated in large scale transactions.

The percentage same-basket variable indicates a proportion of households purchasing both items in an item-pair in the same basket during the same transaction. Given a product pair ($p_i$, $p_j$) this feature computes the proportion of households $\mathfrak{h}$ who bought them together in the same basket at least once. Mathematically, the equation provides:

$$\beta_{ij} = \frac{\{\sum \mathfrak{h} \mid n(\mathfrak{b}_\mathfrak{h}(p_i, p_j)) \geq 1\}}{\{\sum \mathfrak{h} \mid [n(\mathfrak{b}_\mathfrak{h}(p_i, p_j)) + n(\mathfrak{b}_\mathfrak{h}(p_j)) + n(\mathfrak{b}_\mathfrak{h}(p_i))] \geq 1\}},$$

where $\mathfrak{b}_\mathfrak{h}(p_i, p_j)$ indicates a basket purchased by household $\mathfrak{h}$ which contained $p_i$, $p_j$.

For any product pair ($p_i$, $p_j$), if this percentage is high enough, the value may be indicative of variety seeking behavior. The item-pair in this example may be in consideration as a potential candidate for a variety substitute item-pair based on the high percentage same-basket value. In contrast, if the proportion of such households is small (below a threshold value), it might be an indication that the item-pair serves the same need state. In other words, if the items are typically purchased separately in different baskets and/or during different transactions, the items in the item-pair are more likely traditional substitutes.

Thus, the percentage same-basket variable value is higher for variety item-pairs as compared to traditional item-pairs. Traditional substitutes are typically very similar in terms of the attributes, whereas the variety substitutes differ in one or more attributes. Traditional item-pairs are more similar in terms of item description and price, as compared to variety substitutes.

In some examples, the variety cluster operation includes a lesser number of item-pairs. Identifying the pattern becomes more difficult for the multi-stage cluster component. Across categories, the extent of traditional substitution and variety substitution may be different. The third-stage cluster component, in other examples, uses a k-medoid clustering (k=2) and passes different combinations of the four variables in the second set of variables to form the sub-clusters.

The multi-stage cluster component utilizes lift and percentage same-basket variable value indicating households that purchased the item-pair in the same basket as key identifiers between the two classes, in other examples. The multi-stage cluster component takes one or both of item description similarity and demographic similarity variables at a time with the two key identifiers.

The third-stage cluster component runs the K-Medoids clustering following the profiling to name the sub-clusters. For each of the different variable combinations, the third-stage cluster components produce two sub-clusters, a traditional substitute item-pair sub-cluster and a variety substitute item-pair sub-cluster. The third-stage cluster component uses a voting mechanism to get to final class assignment for each of the item-pairs. In case of a tie, the third-stage cluster component uses the combined score of lift and percentage same-basket for household that purchased both items in the item-pair in the same basket as a tie-breaker. The third-stage cluster component assigns the item-pair in either of the two sub-classes.

Figure 4:
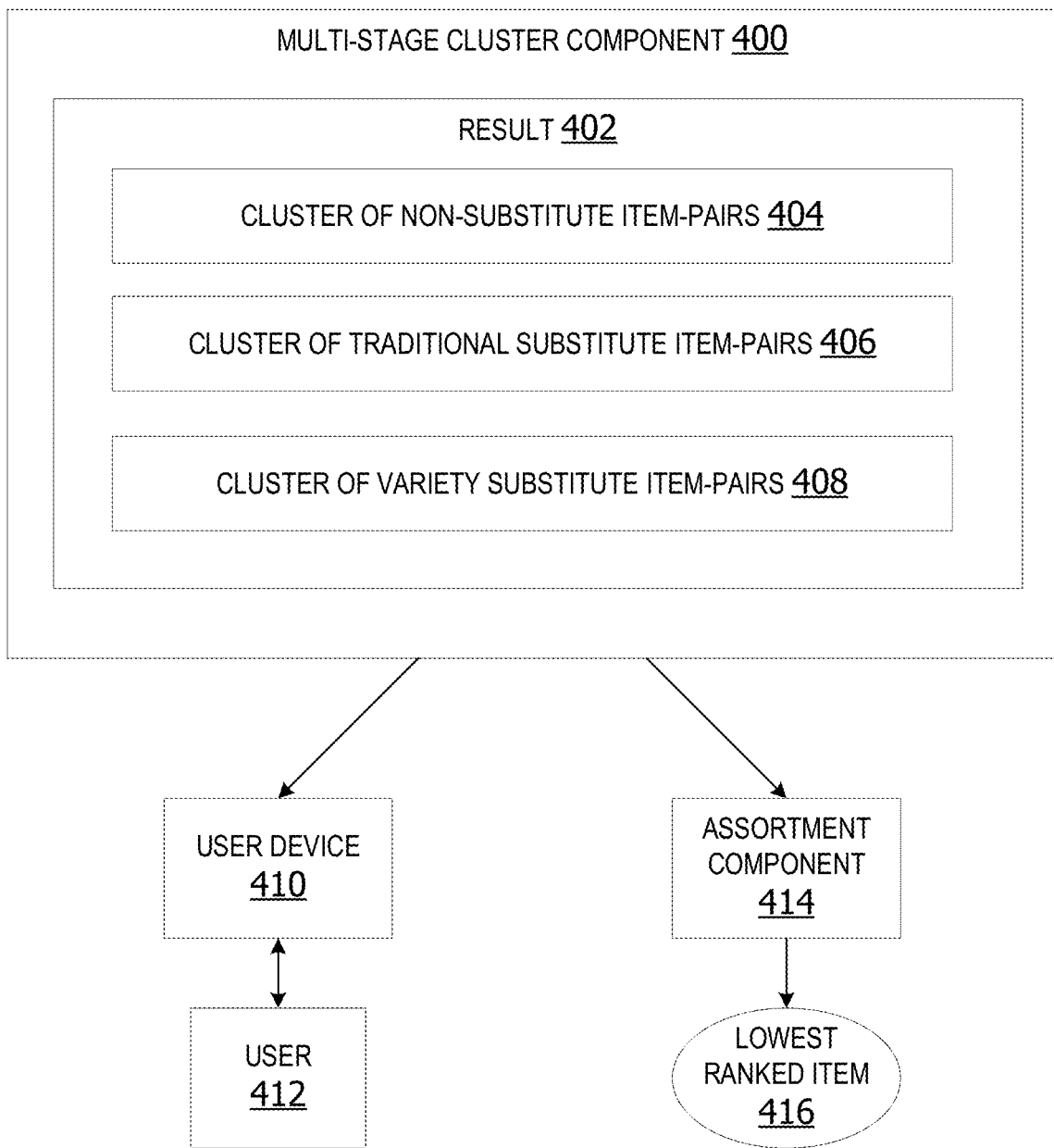
FIG. 4 is an exemplary block diagram illustrating a multi-stage clustering analysis result.

FIG. 4 is an exemplary block diagram illustrating a multi-stage clustering analysis result. A multi-stage cluster component 400 generates a result 402 based on a multi-stage cluster analysis of a plurality of item-pairs in a category associated with a selected item. The result 402 in this example includes a cluster of non-substitute item-pairs 404, a cluster of traditional substitute item-pairs 406, and a cluster of variety substitute item-pairs 408. In some examples, the multi-stage cluster component 400 outputs the result 402 to a user device 410 associated with one or more users, such as user 412. In other examples, the result 402 is output to the user 412 via a user interface device, such as the user interface component 110 in FIG. 1.

The result 402 in some examples is output as a flat file with all possible item-pairs in the selected category associated with the selected item. The result 402 may include the relevant propensity scores and/or rankings associated with each substitute item.

The result 402 may be used for assortment optimization, item deletion decisions, and/or item placement optimization. For example, the result 402 is utilized by an assortment component 414 to identify a lowest ranked item 416 for removal from inventory. In other examples, the result may be utilized to determine item placement in a retail store, warehouse, distribution center, or other locations for displaying items. In one example, variety items and substitute items are placed in close proximity on a same shelf or within close proximity within a display area.

FIG. 5 is an exemplary block diagram illustrating a multi-stage clustering analysis result 500 with item ranks. The result 500 includes an identification of a set of one or more variety item-pairs 502 and/or an identification of a set of one or more traditional substitute item-pairs 504.

The set of variety item-pairs 502 in this non-limiting example includes item-pair 506 including item A and item B.

The item-pair 506 includes a variety score 508 for item A and item B. Another item-pair 510 includes item A and item C with variety score 512. The variety score indicates a degree of relationship between the items in each variety item-pair. For example, if the selected item A is regular ketchup and item B in item-pair 506 is spicy ketchup, a high variety score 508 indicates that item A and item B are frequently purchased together. If item-pair 510 has a low variety score 512, the low variety score 512 indicates that item A and item C are typically not purchased together, or they are purchased together less frequently than item A and item B.

The result 500 may also include a ranking for each variety substitute item for the selected item A. In this example, item B has a rank 514 and item C has a rank 516. If item C has a higher rank than item B, the higher rank indicates that item C is purchased together with item A more frequently than item B. The higher rank may also indicate a higher likelihood that item C will be purchased together with item A by consumers in the future.

The set of traditional substitute item-pairs 504 in this non-limiting example may include an item-pair 518 including the selected item A and an item D. This item-pair has a traditional score 520. The item-pair 522 for the selected item A and item E has a traditional score 524. The traditional score indicates which item-pair is the better traditional substitute for the selected item A.

The result 500 in other examples may include a score-based ranking for each traditional substitute item in the set of traditional substitute item-pairs 504. In this example, item D has an assigned rank 526 and item E has an assigned rank 528. If the rank 526 for item D is higher than the rank 528 of item E, the rank indicates that item D is the preferred or better traditional substitute for the selected item A.

Figure 6:
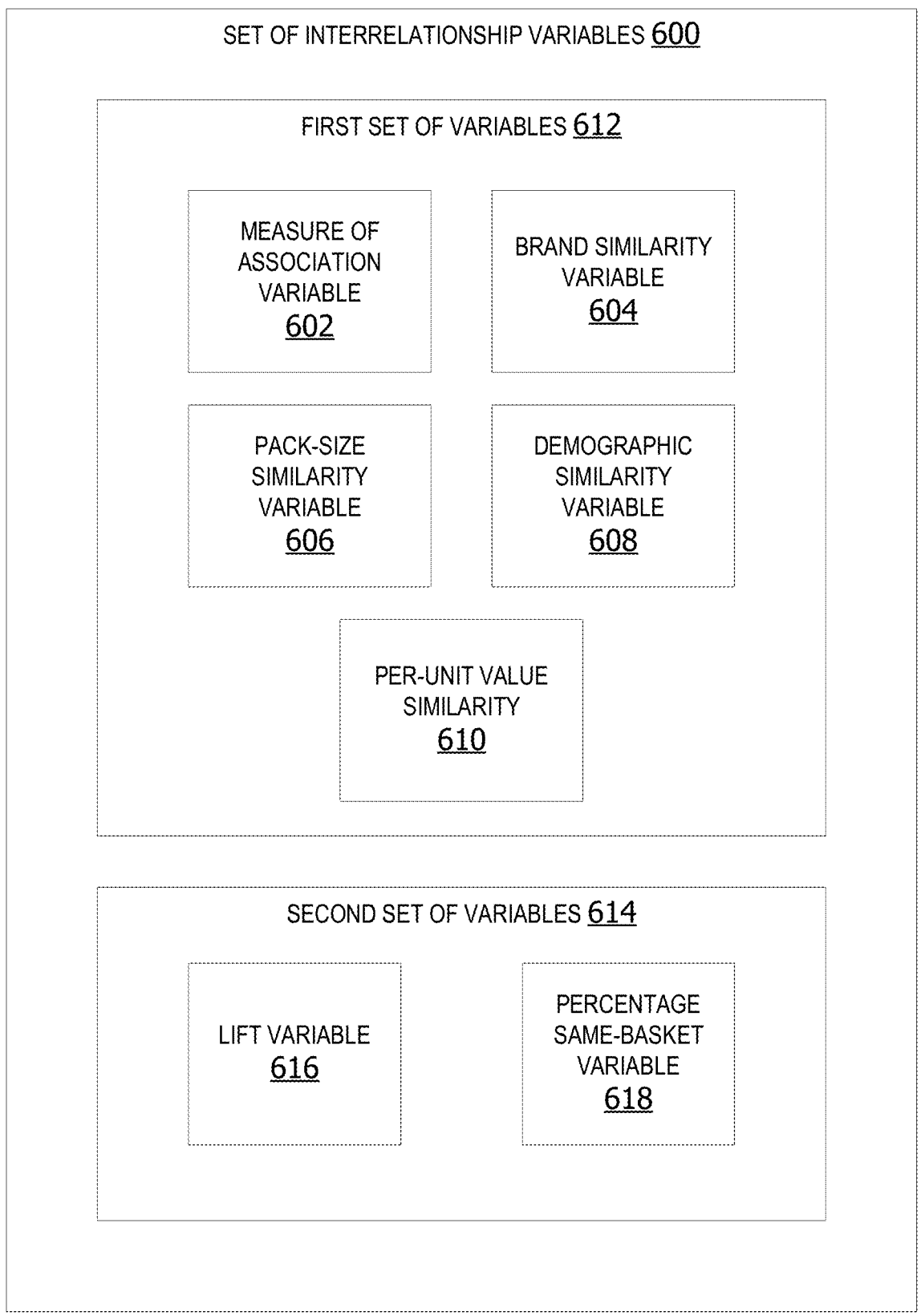
FIG. 6 is an exemplary block diagram illustrating a set of interrelationship variables.

FIG. 6 is an exemplary block diagram illustrating a set of interrelationship variables 600. The set of interrelationship variables 600 may include a measure of association variable 602, a brand similarity variable 604, a pack-size similarity variable 606, a demographic similarity variable 608, and/or a per-unit value similarity 610 in a first set of variables 612. The first set of variables 612 are utilized by a first stage cluster component during an initial cluster operation.

The measure of association variable 602 is a calculated measure of association between the two items in a given item-pair. The measure of association is a transformation of yulesQ, a commonly used metric to understand product association. As the measure of association for a given item-pair increases, the chances that the item-pair is a substitute item-pair also increases. In other words, there is a correlation between the measure of association between items and likelihood of the items being classified as substitute items.

In some examples, to calculate a value for the measure of association variable 602, the multi-stage cluster component considers all the baskets b from a year (52 weeks). Given an item-pair, the multi-stage cluster component calculates how purchase of a first item $p_i$ changes the odds of purchase of a second item $p_j$. The, the multi-stage cluster component calculates the odds of buying $p_j$ for the customers who bought $p_i$ and the odds of buying $p_j$ for the customers who did not buy $p_i$ to finally compute 'odd's ratio'. A value for the measure of association variable of an item-pair may be calculated as:

$$m_{ij} = \frac{\text{Odd's Ratio} - 1}{\text{Odd's Ratio} + 1}$$

The brand similarity variable 604 is a variable associated with similarity between different brands. The system calculates a brand similarity index for all traditional and/or variety item-pairs. Brand loyal households are more likely to substitute one item for another item if they are from the same brand. A higher value for the brand similarity variable indicates the item-pair is more likely to be a substitute pair.

In some examples, brand similarity value is calculated using a mapping $\mathcal{F}: \mathcal{B} \times \mathcal{B} \to \mathbb{R}[0,1]$, where $\mathcal{B}$ refers to the collection of all possible product brands from a category. If the item-pairs have the same brand, then brand similarity has a value of "1" in this example. Instead of using a discrete scale (0 or 1), the multi-stage cluster component may compute brand similarity value on a continuous scale. A fuzzy matching takes care of the cases of 1) brand names written in abbreviations, 2) spelling mistakes etc. In other examples, character-level bigrams are applied to tokenize the brand name. Jaccard similarity is then used to generate a value for brand similarity.

Brand loyal households are more likely to substitute one item for the item in the item-pair if both items are from the same brand. A higher brand similarity value indicates that the items in a given item-pair is likely to be a substitute pair.

The pack-size similarity variable 606 measures how similar a given item-pair in terms of pack-size. Pack-size indicates the number of items in a single unit. The pack-size indicates the number of items. The pack-size may include, for example, a single pack (single count), double pack (two count), etc. For example, soft drinks bottles may be sold individually as a single bottle, in a four-pack holding four bottles, in a six-pack holding six bottles, in a twelve-pack, a twenty-four pack, etc. Bundling items into different pack sizes is prevalent in food and consumables category. Different pack-sizes cater to different household segments with varying household size and other demographic features.

Item substitution is more common between items having similar pack-sizes. A single pack item is more likely to be substituted for another single pack item. A multi-pack item is less likely to be substituted for a single pack item. For example, a multi-pack item of twelve is more likely to be substituted with another multi-pack item of fourteen. The twelve-count multi-pack item is less likely to be substituted with a single-count or two-count item.

For an item $p_i \in \mathbb{P}$, pack-size indicates number of units of the product $p_i$ being sold as one single product, where $\mathbb{P}$ represents all items in a category. Consider the function:

$$\mu: \mathbb{I} \to \mathcal{P}$$

is a mapping from the set of integers to set of all possible pack-size buckets, such that depending on the distribution of pack counts, μ assigns the item one pack-size bucket.

Then for a given item-pair $(p_i, p_j)_{i \neq j}$, we can define pack-size similarity index $(\rho_{ij})$ as:

$$\rho_{ij} = 1 \text{ if } \mu(\mathcal{S}_{p_i}) = \mu(\mathcal{S}_{p_j}), 0 \text{ otherwise.}$$

A value of 1 for this feature indicates both the products fall into a similar pack-size bucket and more likely to be substitute.

The demographic similarity variable 608 is a variable for calculating a value representing demographic similarity between consumers purchasing the items in an item-pair. The demographic similarity variable 608 in some examples is a framework that captures the customer segments that purchase an item from a selected category and taps the customer's demographic information.

Each household $\mathfrak{h}$ can be represented as a collection of following factors:

$\mathfrak{h}$={Education,Ethnicity,Adult Quantity,Children Quantity,Income,Marital Status,Age}

The multi-stage cluster component calculates the percentage count of all these variables for an item which brings down the values in a range of [0, 1]. A difference in a certain specific variable may be attenuated by other variables where the difference is less while comparing two demographic vectors. To mitigate this, in some examples, the multi-stage cluster component performs a principal component analysis (PCA) to obtain the linear combinations of all the variables in the set of interrelationship variables. The maximum variance of the data may be captured. The multi-stage cluster component further uses one or more Kaiser criterion to select the number of principle components to be considered. Finally, the cosine similarity between two vectors of reduced dimensions gets calculated. This similarity measure captures the demographic relatedness of customer segments for both the products in an item-pair. If the final demographic representation of each households belongs to a space $\mathcal{R}_d$ with reduced dimension than original, then we define the similarity function as a mapping:

$$\phi: \mathcal{R}_d \times \mathcal{R}_d \to \mathbb{R}[0,1],$$

where φ is a cosine similarity function.

A second set of variables 614 may be utilized by a third stage cluster component during a variety cluster operation. The second set of variables 614 may include a lift variable 616 and/or a percentage same-basket variable 618.

The lift variable 616 is a widely-used metric for market basket analysis. For an item-pair, if the lift value is greater than "1", it indicates that the items in the item-pair are likely to co-occur in the same transaction. Thus, for variety items, lift is likely to be higher. However, for traditional items, purchase of one item nullifies the purchase probability of the other item because they serve the same need. Therefore, the lift value for a traditional item-pair is lower than the lift value for variety substitute items.

FIG. 7 is an exemplary chart 700 illustrating a demographic similarity variable factors 702. The factors 702 considered during the demographic similarity variable analysis includes, for example, but without limitation, education 704, ethnicity, 706, adult quantity 708, child quantity 710, income 712, marital status 714, origin-of-manufacture 716 of items, and/or age 718.

The education 704 factor may include level of education of a customer as it relates to purchasing decisions. Education 704 may include levels such as below high school, high school graduate, college, or graduate level education.

The ethnicity 706 factor may include ethnic and/or culture information associated with one or more consumer segments. This factor includes local/regional, cultural, and/or ethnic influences associated with transactions due to greater regional interest associated with one or more items and/or combinations of items.

The adult quantity 708 takes into considered the number of adults in a family. Various sizes of family may prefer different item types and/or different pack-sizes to accommodate larger numbers of adults in a single household. Likewise, child-quantity 710 in a single household or family may influence transaction patterns, item pack-size, varieties purchased, and types of items purchased.

Income 712 in some non-limiting examples captures purchasing ability of customers. Income 712 may rank income into three broad categories, such as low, medium, and high. However, in other examples, income 712 may be quantified using income values, income ranges, or any other type of ranks. Marital status 714 in this example considers married and single status as influencing purchase decisions.

Origin-of-manufacture 716 refers to preferences of consumers that prefer items made-in-America or some other manufacturing origin. However, examples are not limited to American-made products. In other examples, variables may include consumer preferences for products made in any nation or country-of-origin.

Age 718 factors buying and consumption patterns of consumers based on age. Transaction trends and patterns for an item may vary significantly across age brackets. An item which is popular among youth may have little or no value to older segments of the population. In some examples, consumers may be classified in age brackets, such as, but not limited to, over-fifty, forty-to-fifty, twenty-five-to-forty, fifteen-to-twenty-five, and under fifteen. The examples are not limited to these examples.

In some examples, the system calculates the percentage count of all the factors for the demographic similarity variable associated with an item to bring down the values in a range of [0, 1]. The difference in a certain specific factor may be attenuated by other factors, where the difference is less while comparing two demographic vectors. To mitigate this, the system performs principal component analysis (PCA) which obtains the linear combinations of all the factors 702. The maximum variance of the data may be captured. The system uses Kaiser criteria to select the number of principle components to be considered. Finally, the cosine similarity between two vectors of reduced dimensions gets calculated. This similarity measure captures the demographic relatedness of customer segments for both the items in a given item-pair.

Figure 8:
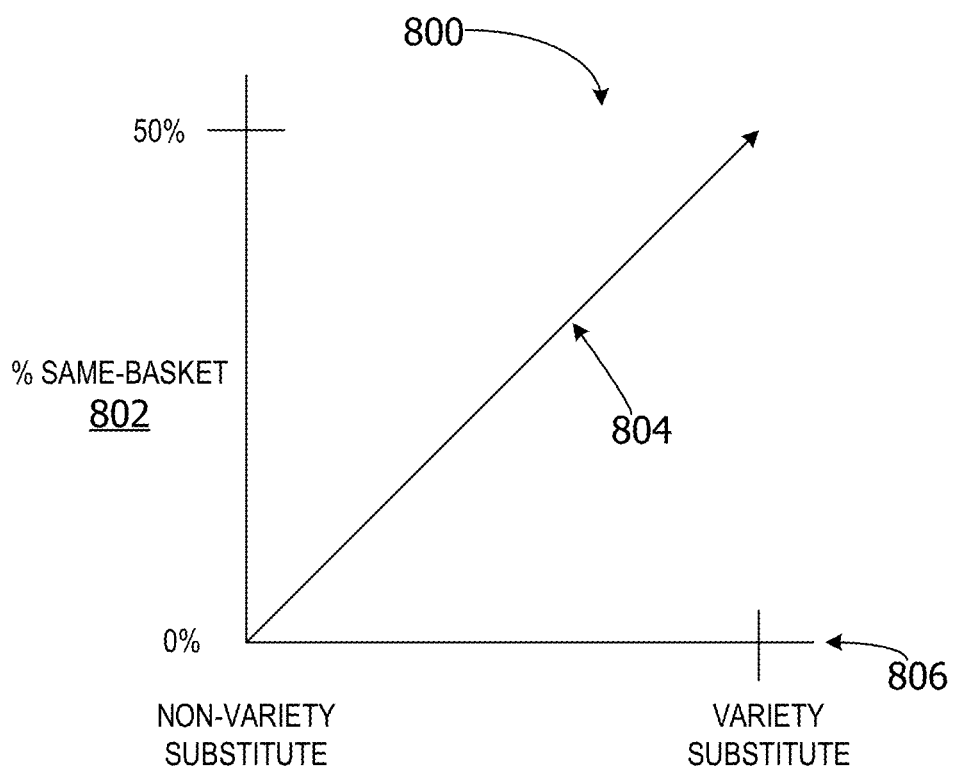
FIG. 8 is an exemplary graph illustrating a percentage same-basket variable.

FIG. 8 is an exemplary graph 800 illustrating a percentage same-basket variable 802. As the percentage of consumers purchasing both items in an item-pair together increases, as shown along the y-axis 802, the strength of the items as variety substitutes increases, as shown along the x-axis 806. The line 804 shows a direct correspondence between percentage same-basket value and variety substitute classification. In other words, the interrelationship between the two items as same-basket cohorts is indicative of variety substitute status for the items. As the percentage of same-basket purchases of two items increases, the probability that these two items are variety substitutes also increases.

In some examples, the % same-basket variable value for households that purchased the item-pair in the same basket. For example, if the percentage of households that purchased both items in any given item-pair is large, the percentage same-basket value indicates the items in the item-pair serves a need for variety. Therefore, the item-pair is more likely to be a variety pair.

In contrast, if the percentage same-basket value is small (below a threshold), the percentage same-basket value indicates that items in the item-pair serve the same need. In other words, a low percentage same-basket value indicates items in an item-pair are substitute items in a traditional sense.

Figure 9:
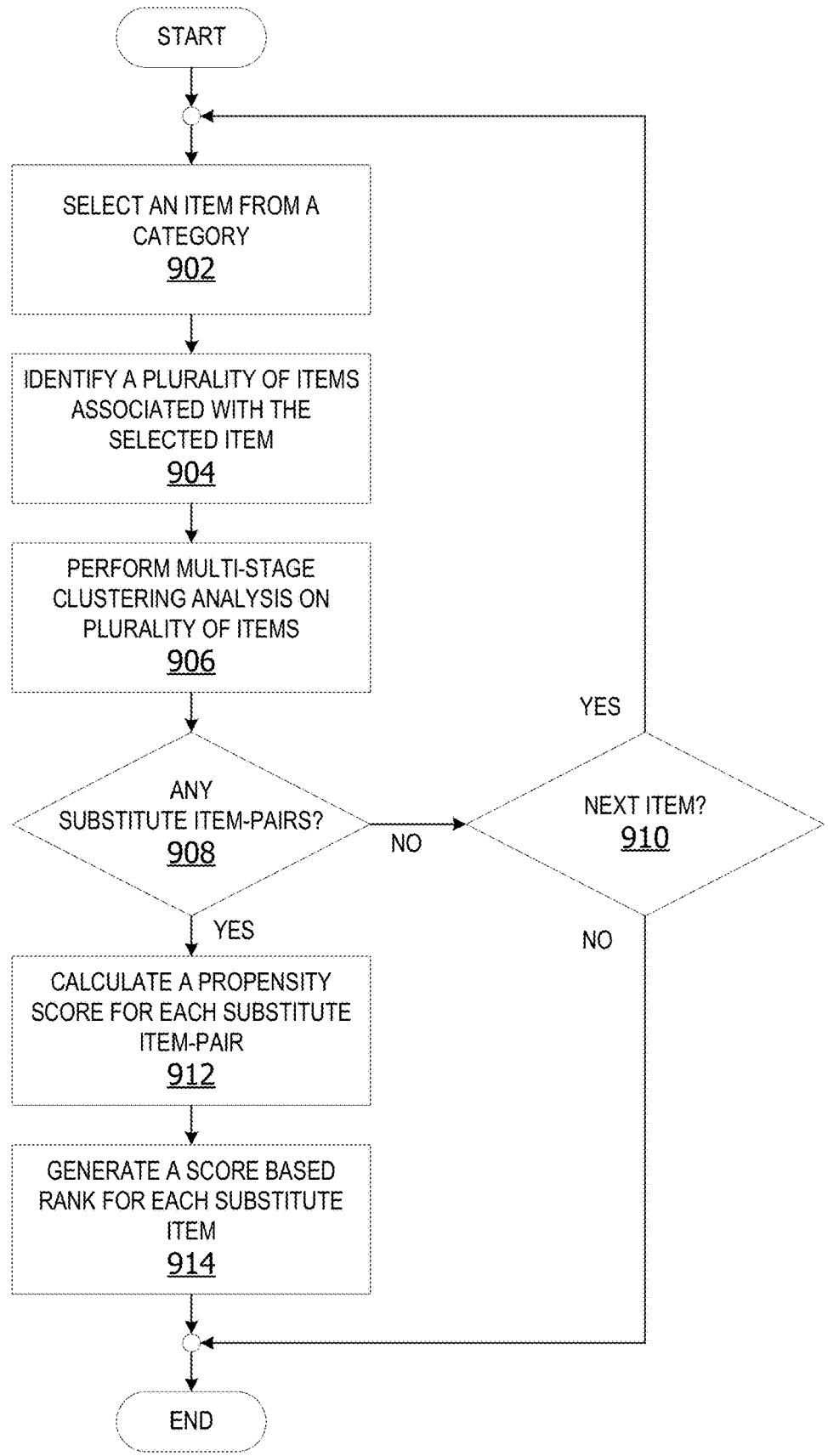
FIG. 9 is an exemplary flow chart illustrating operation of the computing device to perform a multi-stage clustering analysis on a plurality of item-pairs.

FIG. 9 is an exemplary flow chart illustrating operation of the computing device to perform a multi-stage clustering analysis on a plurality of item-pairs. The process shown in FIG. 9 may be performed by a multi-stage cluster component executing on a computing device, such as, but not limited to, the computing device 102 in FIG. 1.

The process begins by selecting an item from a category at 902. A plurality of items associated with the selected item is identified at 904. The multi-stage clustering analysis is performed on the plurality of items at 906. A determination is made whether any substitute item-pairs are present at 908. If no, a determination is made whether there is a next item to analyze at 910. If no, the process terminates thereafter.

Returning to 910, if a next item is available, the process iteratively executes operations 902 through 908 until substitute item-pairs are present at 908. A propensity score is calculated for each substitute item-pair at 912. A score based rank is generated for each substitute item at 914. The process terminates thereafter.

While the operations illustrated in FIG. 9 are performed by a server or other computing device, aspects of the disclosure contemplate performance of the operations by other entities. For example, a cloud service may perform one or more of the operations.

Figure 10:
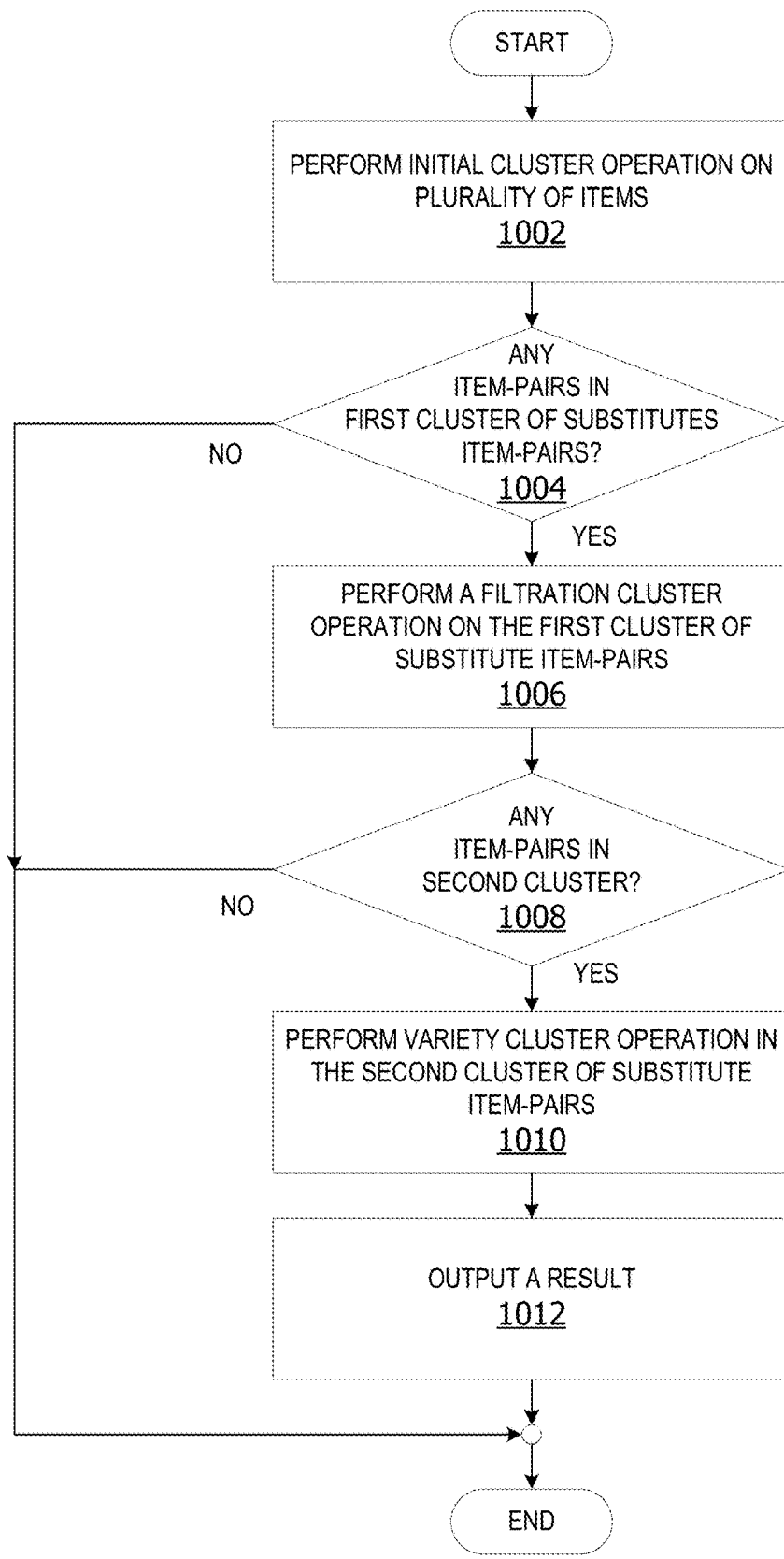
FIG. 10 is an exemplary flow chart illustrating operation of the computing device to generate a multi-stage clustering analysis result.

FIG. 10 is an exemplary flow chart illustrating operation of the computing device to generate a multi-stage clustering analysis result. The process shown in FIG. 10 may be performed by a multi-stage cluster component executing on a computing device, such as, but not limited to, the computing device 102 in FIG. 1.

An initial cluster operation is performed on a plurality of items at 1002. A determination whether any item-pairs are present in the first cluster of substitute item-pairs at 1004. If no, the process terminates thereafter.

If at least one substitute item-pair is present in the first cluster of substitute item-pairs at 1004, a filtration cluster operation is performed on the first cluster of substitute item-pairs at 1006. A determination whether any item-pairs are present in the second cluster of substitute item-pairs is made at 1008. If no, the process terminates thereafter.

If one or more item-pairs are present in the second cluster of substitute item-pairs at 1008, a variety cluster operation is performed on the second cluster of substitute item-pairs at 1010. A result of the variety cluster operation is output at 1012. The process terminates thereafter.

While the operations illustrated in FIG. 10 are performed by a server or other computing device, aspects of the disclosure contemplate performance of the operations by other entities. For example, a cloud service may perform one or more of the operations.

Figure 11:
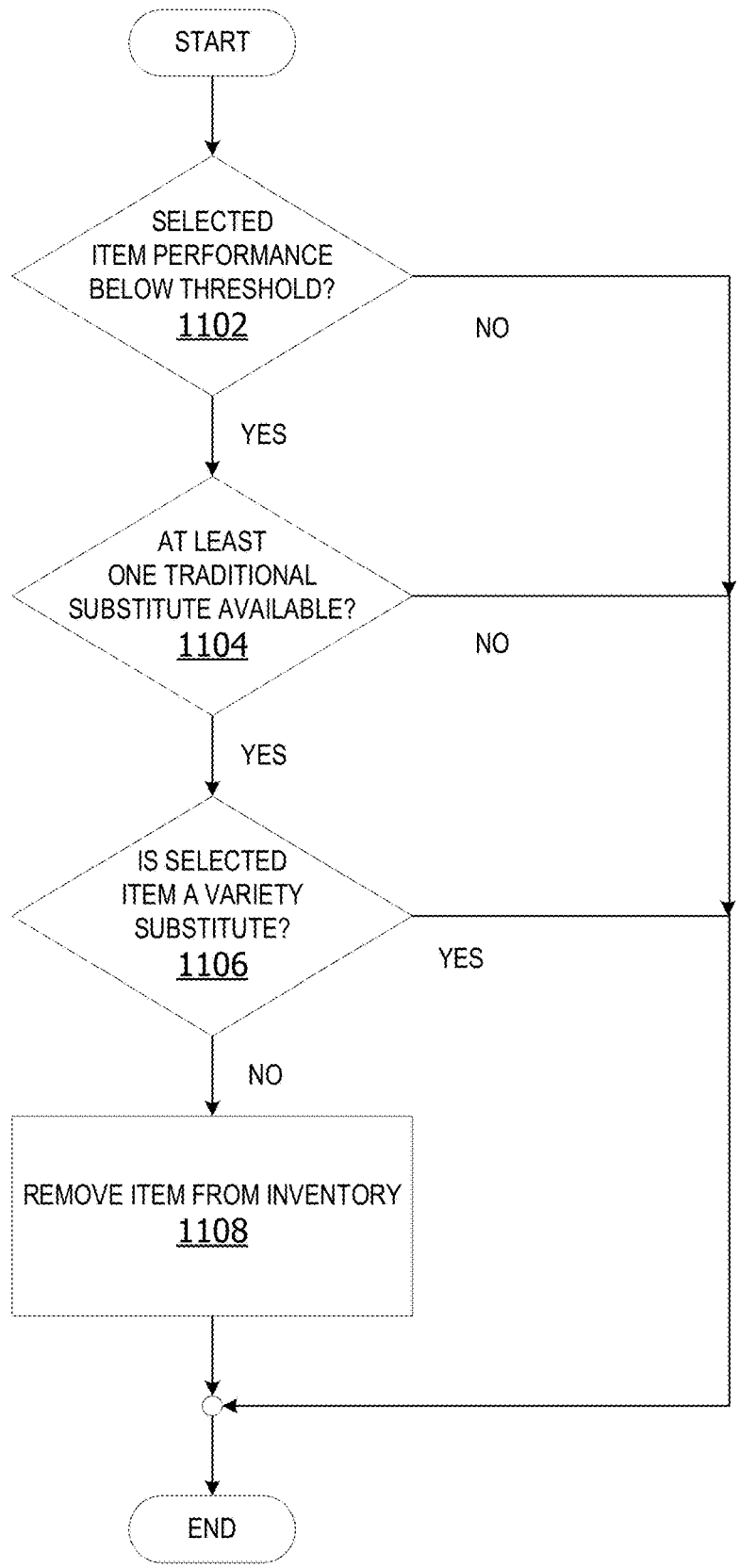
FIG. 11 is an exemplary flow chart illustrating operation of the computing device to utilize multi-stage clustering analysis results for inventory management.

FIG. 11 is an exemplary flow chart illustrating operation of the computing device to utilize multi-stage clustering analysis results for inventory management. The process shown in FIG. 11 may be performed by a multi-stage cluster component executing on a computing device, such as, but not limited to, the computing device 102 in FIG. 1.

The process begins by determining whether a selected item performance is below a threshold at 1102. If no, the process terminates thereafter. If the performance is below the threshold at 1102, a determination is made whether at least one traditional substitute is available at 1104. If no, the process terminates thereafter.

If at least one traditional substitute is available, a determination is made whether the selected item is a variety substitute at 1106. If yes, the process terminates thereafter.

If the selected item is not a variety substitute at 1106, the item is removed from inventory at 1108. The process terminates thereafter.

While the operations illustrated in FIG. 11 are performed by a server or other computing device, aspects of the disclosure contemplate performance of the operations by other entities. For example, a cloud service may perform one or more of the operations.

FIG. 12 is exemplary pseudocode for a filtration cluster operation. The pseudocode 1200 utilizes a text mining approach to determine word similarity between descriptions of a first item and a second item in each item-pair. Word similarity and word length is analyzed at 1202. Description similarity for all words in a description of the first and second items in each item-pair are analyzed at 1204. The description similarity is normalized at 1206. The cluster which has a higher average value for item description similarity is the fine-tuned substitute cluster.

Figure 13:
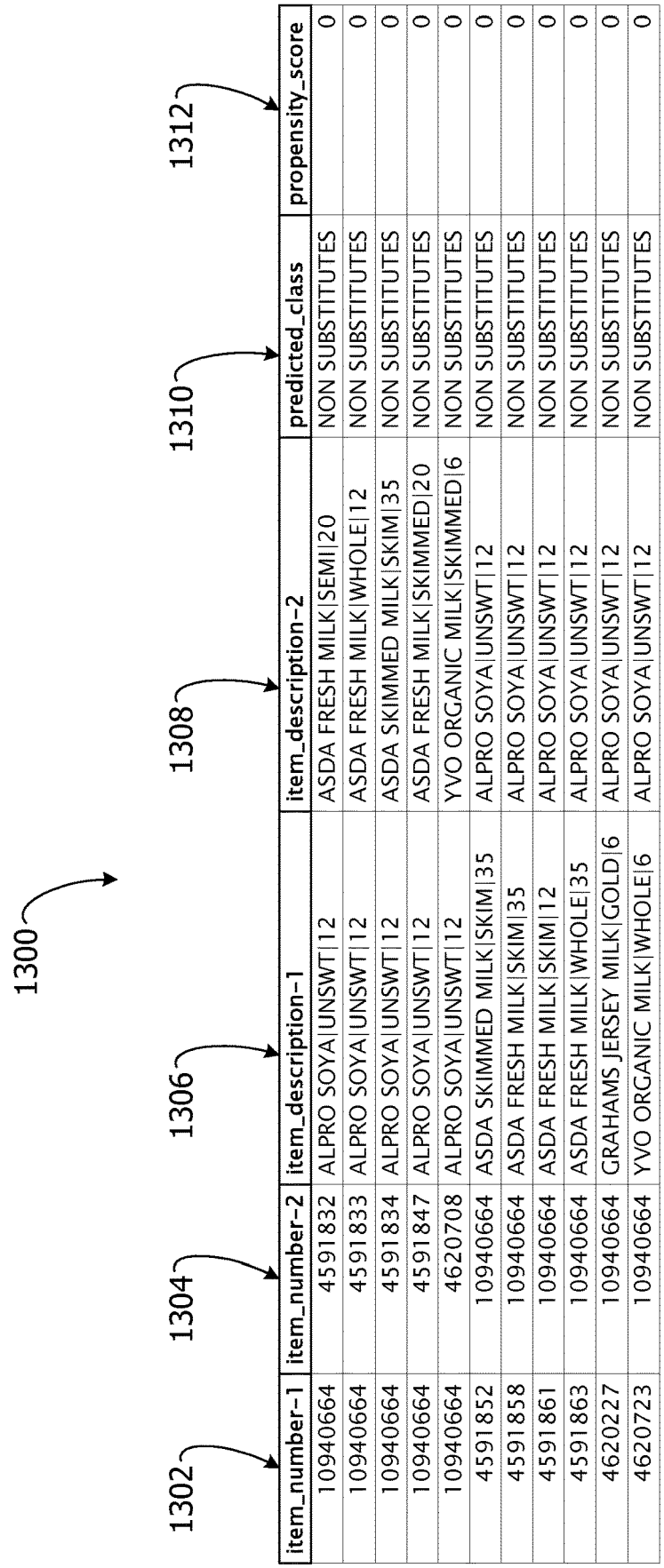
FIG. 13 is an exemplary non-substitute item-pair cluster result.

FIG. 13 is an exemplary non-substitute item-pair cluster result 1300. In this non-limiting example, the result 1300 includes an identification of an item number 1302 for a first item in each item-pair, an item number 1304 for the second item in each item-pair, a description 1306 of the first item in each item-pair, a description 1308 of the second item in each item-pair, a predicted class 1310 for each item-pair, and a propensity score 1312 for each item-pair.

In this example, the predicted class for each of the item-pairs in the non-substitute item-pair cluster is a "Non-substitutes" class. Likewise, the propensity score 1312 for every item-pair in the non-substitute item-pair cluster is zero, indicating the items in each item-pair are not substitutes for each other.

Figure 14:
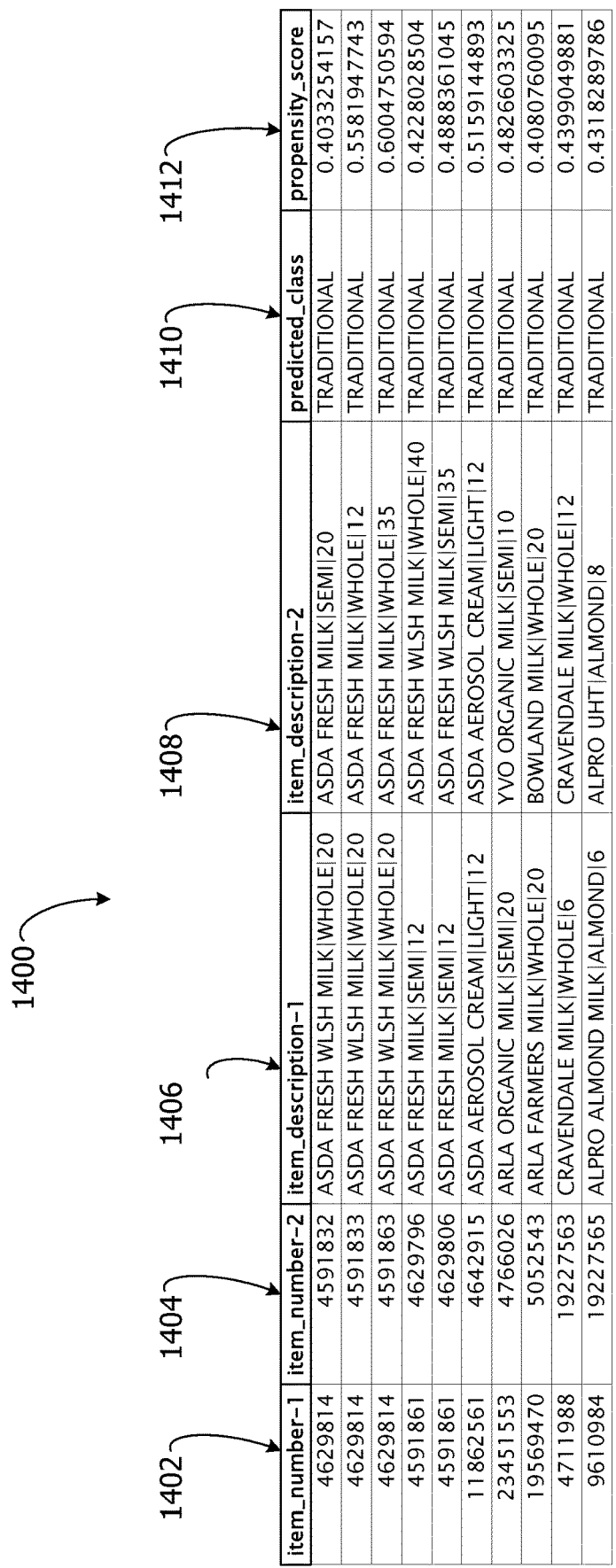
FIG. 14. is an exemplary traditional substitute item-pair cluster result.

FIG. 14. is an exemplary traditional substitute item-pair cluster result. In this non-limiting example, the result 1400 includes an identification of an item number 1402 for a first item in each item-pair, an item number 1404 for the second item in each item-pair, a description 1406 of the first item in each item-pair, a description 1408 of the second item in each item-pair, a predicted class 1410 for each item-pair, and/or a propensity score 1412 for each item-pair.

In this example, the predicted class for each of the item-pairs in the traditional substitute item-pair cluster is a "Traditional" class. Likewise, the propensity score 1412 for every item-pair in the traditional substitute item-pair cluster is greater than zero, indicating the items in each item-pair may qualify as substitutes for each other, depending on their individual traditional scores and/or rankings.

In some examples, a higher propensity score indicates a greater propensity of the items in the item-pair to server as substitutes for each other. For example, the score 0.600475059 associated with the item-pair at row 1414 is the highest propensity score in this cluster, indicating the two items in the item-pair at row 1414 have a highest propensity to server as traditional substitutes for each other.

Figure 15:
FIG. 15 is an exemplary variety substitute item-pair cluster result.

FIG. 15 is an exemplary variety substitute item-pair cluster result. In this non-limiting example, the result 1500 includes an identification of an item number 1502 for a first item in each item-pair, an item number 1504 for the second item in each item-pair, a description 1506 of the first item in each item-pair, a description 1508 of the second item in each item-pair, a predicted class 1510 for each item-pair, and/or a propensity score 1512 for each item-pair.

In this example, the predicted class for each of the item-pairs in the variety substitute item-pair cluster is a "Variety" class. Likewise, the propensity score 1512 for every item-pair in the variety substitute item-pair cluster is greater than zero, indicating the items in each item-pair may qualify as variety substitutes for each other, depending on their individual variety scores and/or rankings.

ADDITIONAL EXAMPLES

The system in some examples takes a category number as a primary input to create category features for item-pairs from three primary data sources, including POS data, item attribute data, and demographic data. This feature creation is automated and generic. It is implementable for any retail house having access to all three data sources.

In other examples, the system determines competitive interrelationship between item-pairs in a retail store. The interrelationship includes non-substitute items, traditional substitute items, and variety substitute items. The system produces a flat file with all possible item-pairs in a category along with interrelationship and relevant propensity scores.

The system in another example creates an exhaustive profile of an item-pair to understand the interrelation between items. An item-pair is evaluated in terms of transaction pattern by the consumers, attributes of the item-pairs, and/or the demographics of the consumers who have purchased the items.

In another example, shelf space in a brick and mortar store is limited. It is desirable to keep the most optimal set of items on the shelf and in the store. The multi-stage cluster component determines competitive interrelationships between items in a category to identify traditional substitutes and variety substitutes of selected items. The system analyzes the overall profile of an item-pair via culling data from diverse sources and use machine learning techniques.

A category advisor may take an informed decision on item deletions from inventory as well as negotiating with suppliers on what items to stock based on the item interrelationships.

A multi-stage clustering approach may be utilized to identify the interrelationship between any item-pair. The multi-stage clustering approach identifies interrelationships between all possible item-pairs within a given category.

The multi-stage cluster component performs a multi-stage clustering approach in which a cluster of non-substitute item-pairs is separated from a cluster of substitute item-pairs during an initial cluster operation, followed by a filtration stage to fine-tune the substitute item-pair cluster. In a final stage, the multi-stage cluster component identifies traditional and variety substitutes of a selected item.

An analytical determination of competitive inter-relationship between item-pairs is performed in other examples. An algorithm is used to determine a score or inter-relationship value for each item in an item-pair associated with a selected category.

In other examples, item placement on limited shelf-space is prioritized based on the propensity score and/or the score-based rank. Items are ranked. The lowest ranking items in inventory may be eliminated to prioritize inventory items.

In some examples, the system includes a machine learning component to determine what binds or links two items together in a basket. The machine learning component determines why some items are purchased together. Some attributes indicate items likely to be purchased together. The machine-learning in some examples is unsupervised learning utilizing recursive clustering.

Alternatively, or in addition to the other examples described herein, examples include any combination of the following:

an assortment component, implemented on the at least one processor, that selects an item having a lowest ranking and a selection-rate below a threshold rate for a predetermined time-range for removal from inventory;

a first-stage clustering component that performs an initial cluster operation on the plurality of items using a first set of variables, point-of-sale (POS) data, and item attribute data to generate a first cluster of non-substitute item-pairs and a first cluster of substitute item-pairs;

wherein the first set of variables further comprises a measure of association variable, a brand similarity variable, a pack-size similarity variable, a demographic similarity variable, and a per-unit value similarity variable;
a second-stage clustering component that performs a filtration cluster operation on the first cluster of substitute item-pairs using an item description similarity variable with the POS data and the item attribute data to generate a second cluster of non-substitute item-pairs and a second cluster of substitute item-pairs;
a third-stage clustering component, that performs a variety cluster operation on the second cluster of substitute item-pairs using a second set of variables, the POS data, and the item attribute data to generate a sub-cluster of traditional substitute item-pairs and a sub-cluster of variety items;
wherein the second set of substitute item variables further comprises a lift variable and a percentage same-basket variable;
a result component, implemented on the at least one processor, that generates a flat file comprising a classification of each item-pair and a score assigned to each item-pair, the classification of each item-pair comprising at least one of a non-substitute category, a traditional substitute category, and a variety substitute category;
generating, by a scoring component, a traditional score for each item-pair in the sub-cluster of traditional cluster of substitute item-pairs, the traditional score indicates an extent of traditional substitution between a first item and a second item in the item-pair;
generating, by a scoring component, a variety score for each item-pair in the sub-cluster of traditional cluster of substitute item-pairs, the variety score indicating a degree of interrelationship between a first item and a second item in the item-pair;
wherein the first set of variables further comprises a measure of association variable, a brand similarity variable, a pack-size similarity variable, a demographic similarity variable, and a per-unit value similarity variable;
wherein the second set of variables further comprises a lift variable, and wherein the lift variable is a ratio of a probability of two items being selected together in a same basket to the probability of the two items being selected separately in at least two different baskets;
wherein the second set of substitute item variables further comprises a percentage same-basket variable, the percentage same basket variable comprising a proportion of households purchasing both items in an item-pair together in a same basket at least once;
ranking, by a ranking component, an item associated with a selected item in each item-pair in the second cluster of substitute item-pairs, the ranking generated based on a propensity score assigned to each item-pair by a scoring component;
identifying, by a selection component, an item associated with at least one item-pair having a lowest score-based rank and a selection-rate below a threshold rate for a predetermined time-range for removal from inventory;
ranking, by a ranking component, each item associated with at least one item-pair in the cluster of traditional substitute item-pairs based on the propensity score assigned to each item-pair by a scoring component;
identifying an item having a lowest rank and a selection-rate below a threshold rate for a predetermined time-range for removal from inventory, wherein the identified item is associated with at least one traditional substitute item;
performing an initial cluster operation on a plurality of item-pairs based on a first set of variables, POS data, and item attribute data to generate a first cluster of non-substitute item-pairs and a first cluster of substitute item-pairs;
performing a filtration cluster operation on the first cluster of substitute item-pairs using a description similarity variable with the POS data and the item attribute data to generate a second cluster of non-substitute item-pairs and a second cluster of substitute item-pairs; and
performing a variety cluster operation on the second cluster of substitute item-pairs using a second set of variables, the POS data, and the item attribute data to generate a sub-cluster of traditional substitute item-pairs and a sub-cluster of variety items-pairs within the second cluster of substitute item-pairs.

At least a portion of the functionality of the various elements in FIG. 1, FIG. 2, FIG. 3, FIG. 4, FIG. 5, and FIG. 6 may be performed by other elements in FIG. 1, FIG. 2, FIG. 3, FIG. 4, FIG. 5, and FIG. 6, or an entity (e.g., processor, web service, server, application program, computing device, etc.) not shown in FIG. 1, FIG. 2, FIG. 3, FIG. 4, FIG. 5, and FIG. 6.

In some examples, the operations illustrated in FIG. 9, FIG. 10, FIG. 11, and FIG. 12 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media.

Computer storage media include volatile and nonvolatile, removable and non-removable media implemented in any method or technology for storage of information such as computer readable instructions, data structures, program modules and the like.

Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

Although described regarding an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for calculating competitive interrelationships between item-pairs. For example, the elements illustrated in FIG. 1, FIG. 2, FIG. 3, FIG. 4, FIG. 5, and FIG. 6, such as when encoded to perform the operations illustrated in FIG. 9, FIG. 10, FIG. 11, and FIG. 12, constitute exemplary means for performing a multi-stage clustering analysis on a plurality of items in a category associated with a selected item using a set of interrelationship factors to generate a cluster of non-substitute item-pairs, a cluster of traditional substitute item-pairs, and a cluster of variety item-pairs; exemplary means for calculating a propensity score to each item-pair in the cluster of traditional substitute item-pairs and each item-pair in the cluster of variety item-pairs; exemplary means for generating a ranking for each traditional substitute of the selected item associated with an item-pair in the cluster of traditional substitute item-pairs and a ranking for each variety substitute of the selected item associated with an item-pair in the cluster of variety item-pairs. The ranking is generated based on the calculated propensity score.

In another example, the elements illustrated in FIG. 1, FIG. 2, FIG. 3, FIG. 4, FIG. 5, and FIG. 6, such as when encoded to perform the operations illustrated in FIG. 9, FIG. 10, FIG. 11, and FIG. 12, constitute exemplary means for performing an initial cluster operation on a plurality of item-pairs based on a first set of variables, POS data, and item attribute data to generate a first cluster of non-substitute item-pairs and a first cluster of substitute item-pairs; exemplary means for performing a filtration cluster operation on the first cluster of substitute item-pairs using a description similarity variable with the POS data and the item attribute data to generate a second cluster of non-substitute item-pairs and a second cluster of substitute item-pairs; exemplary means for performing a variety cluster operation on the second cluster of substitute item-pairs using a second set of variables, the POS data, and the item attribute data to generate a sub-cluster of traditional substitute item-pairs and a sub-cluster of variety items-pairs within the second cluster of substitute item-pairs; and exemplary means for outputting a result to at least one user interface component, the result comprising a set of traditional substitute item-pairs associated with the sub-cluster of traditional substitute item-pairs and a set of variety item-pairs associated with the sub-cluster of variety item-pairs.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for calculating competitive interrelationships between item-pairs, the system comprising:
   a memory; and
   at least one processor communicatively coupled to the memory and configured to:
   execute a machine learning component that identifies at least one attribute indicating a link between items for sale that are frequently purchased together at a same time;
   perform a first-stage clustering analysis, using the machine learning component, on a plurality of items in a category associated with a selected item using a set of interrelationship factors to generate a cluster of non-substitute item-pairs, a cluster of traditional substitute item-pairs, and a cluster of variety item-pairs, wherein the generated cluster of non-substitute item-pairs, the cluster of traditional substitute item-pairs, and the cluster of variety item-pairs are generated based on the machine learning component learning a profile of the plurality of items, the profile including the at least one attribute, wherein the cluster of traditional substitute item-pairs has a higher mean value associated with the set of interrelationship factors than the cluster of non-substitute item-pairs, wherein traditional substitute item-pairs are interchangeable items for sale linked by a first attribute of the at least one attribute and the variety item-pairs are the items for sale frequently purchased together at the same time linked by a second attribute of the at least one attribute, and wherein each item of the plurality of items is included in an inventory of items for sale;
   generate a brand similarity index to store the cluster of traditional substitute item-pairs, identified by the higher mean value, and the cluster of variety item-pairs;
   discard the cluster of non-substitute item-pairs;
   perform a second-stage clustering analysis on the cluster of traditional substitute item-pairs and the cluster of variety item-pairs stored in the generated brand similarity index to:
   determine word similarity and word length similarity between descriptions of each item in the cluster of traditional substitute item-pairs,
   determine word similarity and word length similarity between descriptions of each item in the cluster of variety item-pairs, and
   generate a similarity variable for each item in the cluster of traditional substitute item-pairs and the cluster of variety item-pairs responsive to the determined word similarity and word length similarity;
   calculate, based on the generated similarity variable for the each item-pair, a propensity score for the each item-pair in the cluster of traditional substitute item-pairs and each item-pair in the cluster of variety item-pairs indicating a propensity for a second item to be substituted for the selected item in a given item-pair;
   generate a ranking, based on the calculated propensity score, within the brand similarity index for each traditional substitute of the selected item associated with an item-pair in the cluster of traditional substitute item-pairs;
   generate a ranking, based on the calculated propensity score, within the brand similarity index for each variety substitute of the selected item associated with an item-pair in the cluster of variety item-pairs;
   identify the traditional substitute having a highest generated ranking within the brand similarity index and the variety substitute having a highest generated ranking within the brand similarity index, wherein the traditional substitute having the highest generated ranking within the brand similarity index is identified as the best traditional substitute for the selected item and the variety substitute having the highest generated ranking within the brand similarity index is identified as the best variety substitute for the selected item;
   output, to a user device, each item-pair in the cluster of traditional substitute item-pairs and each item-pair in the cluster of variety item-pairs in an order corresponding to the generated rankings within the brand similarity index, wherein the output includes the identification of the best traditional substitute within the brand similarity index and the best variety substitute within the brand similarity index, and
   automatically learn, by the machine learning component utilizing unsupervised learning, the item pair in the cluster of traditional substitute item pairs and the each item-pair in the cluster of variety item-pair in the order,
   wherein:
   the generated ranking is used to determine at least one item of the plurality of items having a lowest assigned score, the lowest assigned score corresponding to an availability of the traditional substitute for the at least one item and an absence of the variety substitute for the at least one item, and
   the at least one item having the lowest assigned score is removed from the inventory of items for sale.

2. The system of claim 1, wherein the processor is further configured to:
   select an item having a lowest ranking and a selection-rate below a threshold rate of substitution for another item for a predetermined time-range for removal from inventory; and
   exclude the traditional substitute having the highest generated ranking and the variety substitute having the highest generated ranking from removal from inventory.

3. The system of claim 1, wherein the processor is further configured to perform an initial cluster operation on the plurality of items using a first set of variables, point-of-sale (POS) data, and item attribute data to generate a first cluster of non-substitute item-pairs and a first cluster of substitute item-pairs.

4. The system of claim 3, wherein:
   the first set of variables further comprises a measure of association variable, a brand similarity variable, and a per-unit value similarity variable, and
   the unsupervised learning utilizes recursive clustering.

5. The system of claim 3, wherein the processor is further configured to perform a filtration cluster operation on the first cluster of substitute item-pairs using an item description similarity variable with the POS data and the item attribute data to generate a second cluster of non-substitute item-pairs and a second cluster of substitute item-pairs.

6. The system of claim 5, wherein the processor is further configured to perform a variety cluster operation on the second cluster of substitute item-pairs using a second set of variables, the POS data, and the item attribute data to generate a sub-cluster of traditional substitute item-pairs and a sub-cluster of variety items.

7. The system of claim 6, wherein the second set of substitute item variables further comprises a lift variable and a percentage same-basket variable.

8. The system of claim 3, wherein the first set of variables further comprises a demographic similarity variable that indicates a value representing demographic similarity between customer segments that purchase the items in an item-pair.

9. The system of claim 3, wherein the first set of variables further comprises a pack size similarity that indicates a similarity between numbers of items in a pack-size of item-pairs.

10. The system of claim 1, wherein the processor is further configured to generate a flat file comprising a classification of each item-pair and a score assigned to each item-pair, the classification of each item-pair comprising at least one of a non-substitute category, a traditional substitute category, and a variety substitute category.

11. A method for calculating competitive interrelationships between item-pairs, the method comprising:
identifying, by a machine learning component implemented on a processor, at least one attribute indicating a link between items for sale that are frequently purchased together at a same time;
performing, by a multi-stage clustering component implemented on the processor using the machine learning component, a first-stage clustering analysis, using the machine learning component, on a plurality of items in a category associated with a selected item using a set of interrelationship factors to generate a cluster of non-substitute item-pairs, a cluster of traditional substitute item-pairs, and a cluster of variety item-pairs, wherein the generated cluster of non-substitute item-pairs, the cluster of traditional substitute item-pairs, and the cluster of variety item-pairs are generated based on the machine learning component learning a profile of the plurality of items, the profile including at least the at least one attribute, wherein the cluster of traditional substitute item-pairs has a higher mean value associated with the set of interrelationship factors than the cluster of non-substitute item-pairs, wherein traditional substitute item-pairs are interchangeable items for sale linked by a first attribute of the at least one attribute and the variety item-pairs are the items for sale frequently purchased together at the same time linked by a second attribute of the at least one attribute, and wherein each item of the plurality of items is included in an inventory of items for sale;
generating, by the processor, a brand similarity index to store the cluster of traditional substitute item-pairs, identified by the higher mean value, and the cluster of variety item-pairs;
discarding, by the processor, the cluster of non-substitute item-pairs;
performing, by the multi-stage clustering component implemented on the processor, a second-stage clustering analysis on the cluster of traditional substitute item-pairs and the cluster of variety item-pairs stored in the generated brand similarity index, wherein performing the second-stage clustering analysis comprises:
determining, by the processor, word similarity and word length similarity between descriptions of each item in the item-pairs,
determining, by the processor, word similarity and word length similarity between descriptions of each item in the cluster of variety item-pairs, and
generating, by the processor, a similarity variable for each item in the cluster of traditional substitute item-pairs and the cluster of variety item-pairs responsive to the determined word similarity and word length similarity;
calculating, by a scoring component implemented on the processor based on the generated similarity variable for each item-pair, a propensity score for each item-pair in the cluster of traditional substitute item-pairs and each item-pair in the cluster of variety item-pairs indicating a propensity for a second item to be substituted for the selected item in a given item-pair;
generating, by the processor, a ranking, based on the calculated propensity score, within the brand similarity index for each traditional substitute of the selected item associated with an item-pair in the cluster of traditional substitute item-pairs;
generating, by a ranking component implemented on the processor, a ranking, based on the calculated propensity score, within the brand similarity index for each variety substitute of the selected item associated with an item-pair in the cluster of variety item-pairs;
identifying, by the ranking component implemented on the processor, the traditional substitute having a highest generated ranking within the brand similarity index and the variety substitute having a highest generated ranking within the brand similarity index, wherein the traditional substitute having the highest generated ranking within the brand similarity index is identified as the best traditional substitute for the selected item and the variety substitute having the highest generated ranking within the brand similarity index is identified as the best variety substitute for the selected item;
outputting, by the multi-stage clustering component implemented on the processor to a user device, each item-pair in the cluster of traditional substitute item-pairs and each item-pair in the cluster of variety item-pairs in an order corresponding to the generated rankings within the brand similarity index, wherein the output includes the identification of the best traditional substitute within the brand similarity index and the best variety substitute within the brand similarity index; and
automatically learning, by the machine learning component utilizing unsupervised learning, the item pair in the cluster of traditional substitute item pairs and the each item-pair in the cluster of variety item-pair in the order,
wherein:
the generated ranking is used to determine at least one item of the plurality of items having a lowest assigned score, the lowest assigned score corresponding to an availability of the traditional substitute for the at least one item and an absence of the variety substitute for the at least one item, and
the at least one item having the lowest assigned score is removed from the inventory of items for sale.

12. The method of claim 11, further comprising:
selecting, by the processor, an item having a lowest ranking and a selection-rate below a threshold rate of substitution for another item for a predetermined time-range for removal from inventory; and excluding, by the processor, the traditional substitute having the highest generated ranking and the variety substitute having the highest generated ranking from removal from inventory.

13. The method of claim 11, further comprising performing, by the processor, an initial cluster operation on the plurality of items using a first set of variables, point-of-sale (POS) data, and item attribute data to generate a first cluster of non-substitute item-pairs and a first cluster of substitute item-pairs.

14. The method of claim 13, wherein the first set of variables further comprises a measure of association variable, a brand similarity variable, and a per-unit value similarity variable.

15. The method of claim 13, wherein the first set of variables further comprises a demographic similarity variable that indicates a value representing demographic similarity between customer segments that purchase the items in an item-pair.

16. The method of claim 13, wherein the first set of variables further comprises a pack size similarity that indicates a similarity between numbers of items in a pack-size of item-pairs.

17. The method of claim 13, further comprising performing, by the multi-stage clustering component implemented on the processor, a filtration cluster operation on the first cluster of substitute item-pairs using an item description similarity variable with the POS data and the item attribute data to generate a second cluster of non-substitute item-pairs and a second cluster of substitute item-pairs.

18. The method of claim 17, further comprising performing, by the multi-stage clustering component implemented on the processor, a variety cluster operation on the second cluster of substitute item-pairs using a second set of variables, the POS data, and the item attribute data to generate a sub-cluster of traditional substitute item-pairs and a sub-cluster of variety items.

19. The method of claim 18, wherein the second set of substitute item variables further comprises a lift variable and a percentage same-basket variable.

20. The method of claim 11, further comprising generating, by a result component implemented on the processor, a flat file comprising a classification of each item-pair and a score assigned to each item-pair, the classification of each item-pair comprising at least one of a non-substitute category, a traditional substitute category, and a variety substitute category.

* * * * *